(12) United States Patent
Singh

(10) Patent No.: US 7,175,818 B2
(45) Date of Patent: *Feb. 13, 2007

(54) EXTRACTION OF METALS WITH DIQUATERNARY AMMONIUM SALTS

(75) Inventor: Waheguru Pal Singh, College Station, TX (US)

(73) Assignee: Lynntech, Inc., College Station, TX (US)

( * ) Notice: Subject to any disclaimer, the term of this patent is extended or adjusted under 35 U.S.C. 154(b) by 230 days.

This patent is subject to a terminal disclaimer.

(21) Appl. No.: 10/758,300

(22) Filed: Jan. 14, 2004

(65) Prior Publication Data

US 2004/0200782 A1    Oct. 14, 2004

Related U.S. Application Data

(63) Continuation-in-part of application No. 10/647,104, filed on Aug. 21, 2003, and a continuation-in-part of application No. 10/427,028, filed on Apr. 30, 2003, and a continuation-in-part of application No. 10/071,872, filed on Feb. 7, 2002, now Pat. No. 6,890,496.

(51) Int. Cl.
    *C22B 11/00* (2006.01)

(52) U.S. Cl. .................... 423/22; 423/24; 210/684

(58) Field of Classification Search ............. 423/22, 423/24; 75/722; 210/634, 638, 684
See application file for complete search history.

(56) References Cited

U.S. PATENT DOCUMENTS

| | | | |
|---|---|---|---|
| 4,012,481 A | 3/1977 | Batz et al. | |
| 4,041,126 A | 8/1977 | Baltz et al. | |
| 4,105,742 A | 8/1978 | Edwards et al. | |
| 4,382,067 A | 5/1983 | Grant | |
| 4,571,266 A | 2/1986 | Konig et al. | |
| 4,726,841 A | 2/1988 | Grant et al. | |
| 4,861,564 A | 8/1989 | Rebek | |
| 5,165,901 A | 11/1992 | Crozier et al. | |
| 5,256,187 A | 10/1993 | Gefvert | |
| 5,284,633 A | 2/1994 | Gefvert | |
| 5,380,947 A | 1/1995 | Chen et al. | |
| 5,478,376 A | 12/1995 | Grant et al. | |
| 5,908,814 A | 6/1999 | Patel et al. | |
| 6,207,143 B1 | 3/2001 | Lezdey et al. | |
| 6,890,496 B2 * | 5/2005 | Singh et al. | 423/22 |
| 2003/0190274 A1 | 10/2003 | Singh | |
| 2003/0226761 A1 | 12/2003 | Featherstone et al. | |

FOREIGN PATENT DOCUMENTS

| | | |
|---|---|---|
| CN | 1146495 A | 4/1997 |
| JP | 58 174532 | 10/1983 |
| JP | 59 179724 | 10/1984 |
| JP | 10 008155 | 1/1998 |
| ZA | 8006992 | 10/1981 |

OTHER PUBLICATIONS

International Search Report, Application No. PCT/US 03/05444, International Filing Date Feb. 24, 2003, 3 sheets.

Jan G. H. du Preez, Elmaré S. Herselman, Hans E. Rohwer, and Bennie J.A>M> van Brecht; "Polynitrogen regents in metal seprations. Part 2. Diquaternary ammonium cations as precipitants for cobalt (II) and copper ;(II) in hydrochloric acid medium"; South African Jounal of Chemistry, vol. 38, No. 2, 1985 pp. 49053, XP009016468.

J. G. H. du Preez, D. P. Shillington and B.J.A.M. van Brecht; "Polynitrogen Reagents in Metal Sepration. Part 1. Ditertitary and Diquaternary Ammonium Extractants for Cobalt (II) and Copper (II) in HCl Medium"; Solvent Extraction and Ion Exchange, vol. 2 No. 6, 1984 pp. 839-858, XP009016470.

XP 002253113, Database CA Online, chemical Abstracts Service, Columbus, Ohio, US; Du Preez, Jan Gysbert Hermanus: "Organic diammonium and related compounds as solvent extractants", retrieved from STN data base accession No. 97: 42075.

(Continued)

*Primary Examiner*—Steven Boss
(74) *Attorney, Agent, or Firm*—Streets & Steele; Jeffrey L. Streets

(57) ABSTRACT

Selective extraction of a metal anion complex, such as a platinum-group metal halide, from an aqueous solution containing other metal anions or anion complexes, by contacting the solution with a diquaternary ammonium salt having two quaternary nitrogens spaced at a distance less than about 10 Å, selectively binding the metal anion complex to the diquaternary ammonium salt to form an organo-metallic complex, and separating the organo-metallic complex from the solution. Alternatively, the diquaternary ammonium salts may be adsorbed or chemically bonded to a substrate, and the metal anion complex-containing solution passed over the substrate. Preferably, the two quaternary nitrogens are spaced a distance apart that is complementary to the ionic diameter of the target metal anion complex. Typically, the platinum group metal halide anion complexes have a valence of −2 and each of the two quaternary nitrogens of the diquaternary ammonium salt have a valence of +1, such that the organo-metallic complex formed is a stable pair.

59 Claims, 22 Drawing Sheets

OTHER PUBLICATIONS

International Search Report, International Application No. PCT/US 03/05444, International Filing Date Feb. 24, 2003, 6 pages.
WPI abstract; AN: 2001-103670 XP-002262954 & CN 1 146 495 (Univ Lamzhou ()CN)); Apr. 2, 1997.
WPI abstract: AN 1979-002004 XP 002262955 & RO 65 77 6 A (Combinatul Petrochimic (RO)) Dec. 15, 1978.
Vanessa J. Wotring, David M. Johnson, and Leonidas G. Bachas; Polymeric Membrane Anion-Selective Electrodes Based on Diquaternary Ammonium Salts; Anal Chem. 1990, 62, pp. 1506-1510.
J. Letho; "Ion Exchange in the Nuclear Power Industry"; Ion Exchange Process Advances and Applications; pp. 39-53.

M. A. Sadler, "Developments in the Production and Control of Ultrapure Water"; Ion Exchange Process Advances and Applications; pp. 15-28.
Arup K. Sengupta and Tushar Roy; "Ion Exchange Mechanism, Resin Properties and Selective Removal of Hexavalent Chromate"; pp. 194-203.
S. Fredric Marsh; "The Effect of Trimethyl, Triehyl, Tripropyl, and Tributyl Amine Functional Groups in Strong-base Anion Exchange Resin on the Sorption fo Pu(iv) from Nitric Acid".
Piers Grumett, "Precious Metal Recovery fromSpent Catalysts"; Platinium Metals Rev, 2003, 47, (4) pp. 163-166.

* cited by examiner

| Compound | D-Value Pd II | Conformation Minimum Energy (kcal/mole) | Connectivity Index (order 2, standard) D | Dipole Moment (debye) E | Electron Affinity (eV) F |
|---|---|---|---|---|---|
| DQ 18 | 2.86 | 39.331 | 11.632 | 12.744 | 7.127 |
| DQ 16 |  | 39.449 | 11.985 | 2.933 | 6.601 |
| DQ 10 | 1.75 | 40.322 | 12.692 | 0.01 | 5.948 |
| DQ 14 | 2.6 | 39.924 | 11.071 | 25.323 | 8.122 |
| DQ 17 | 3.3 | 50.797 | 17.289 | 25.52 | 7.139 |
| DQ 15 | 0.42 | 49.902 | 17.642 | 0.025 | 6.597 |
| DQ 12 | 1.59 | 50.899 | 18.349 | 0.124 | 5.946 |
| DQ 13 | 3.22 | 50.293 | 16.728 | 52.726 | 8.119 |
| DQ 11 | 0.89 | 49.694 | 16.935 | 0.148 | 7.867 |

*FIG. 3A*

| Compound | Dielectric Energy (kcal)/mole) G | Steric Energy (kcal/mole) H | Total Energy (Hartree) I | Heat of Formation (kcal/mole) | HOMO Energy (ev) |
|---|---|---|---|---|---|
| DQ18 | 7.7 | 39.331 | 214.593 | 258.295 | 13.703 |
| DQ16 | 7.211 | 39.597 | 221.775 | 242.427 | 13.635 |
| DQ10 | 6.602 | 40.322 | 236.121 | 218.102 | 13.52 |
| DQ14 | 8.438 | 39.924 | 205.938 | 291.32 | 13.855 |
| DQ17 | 7.759 | 50.797 | 329.153 | 171.131 | 12.628 |
| DQ15 | 7.301 | 49.902 | 336.331 | 155.69 | 12.601 |
| DQ12 | 6.62 | 50.899 | 350.679 | 131.143 | 12.552 |
| DQ13 | 8.487 | 50.293 | 320.496 | 204.337 | 12.687 |
| DQ11 | 8.312 | 49.694 | 321.968 | 190.296 | 12.661 |

FIG. 3B

| Compound | Ionization Potential (eV) L | Log P M | LUMO (eV) Energy N | Shape Index (basic kappa, order 3) O | Valence Connectivity Index (order 2, standard) Q | Solvent Accessible Surface Area (Å²) P |
|---|---|---|---|---|---|---|
| DQ 18 | 13.703 | 6.409 | -7.127 | 21.031 | 521.24 | 11.069 |
| DQ 16 | 13.635 | 6.86 | -6.601 | 22.027 | 539.815 | 11.423 |
| DQ 10 | 13.52 | 7.653 | -5.948 | 23.967 | 576.054 | 12.13 |
| DQ 14 | 13.855 | 6.179 | -8.122 | 13.04 | 485.397 | 10.53 |
| DQ 17 | 12.628 | 12.75 | -7.139 | 36.681 | 813.7 | 16.726 |
| DQ 15 | 12.601 | 13.201 | -6.598 | 37.686 | 831.853 | 17.08 |
| DQ 12 | 12.552 | 13.993 | 5.946 | 39.658 | 883.721 | 17.787 |
| DQ 13 | 12.687 | 12.52 | -8.119 | 26.747 | 778.615 | 16.187 |
| DQ 11 | 12.661 | 12.697 | -7.867 | 35.716 | 793.278 | 16.372 |

FIG. 3C

Predictive Eq. for Pd II $B = 0.0554277*E + 0.610452*L - 16.7616/N - 9.0729$

Predictive Eq. for Pd IV $B = 71.6336*D + 0.463796*E + 23.6272*F + 19.8848*G - 9.37422*H + 2.71931*I + 108.256$ Predictive Eq. for Pt II $B = -276.194*L - 69.6714*M - 4.68162*N - 7.67628*O + 3.7778*P - 154.864*Q + 4211.14$

EXTRACTION OF METALS WITH DIQUATERNARY AMMONIUM SALTS

This application is a continuation-in-part of U.S. application Ser. No. 10/071,872 now U.S. Pat. No. 6,890,496 filed on Feb. 7, 2002, U.S. application Ser. No. 10/427,028 filed on Apr. 30, 2003, and U.S. application Ser. No. 10/647,104 filed on Aug. 21, 2003.

This invention was made with government support under grant number DMI-0216373 awarded by the National Science Foundation (NSF). The government has certain rights in this invention.

BACKGROUND OF THE INVENTION

1. Field of the Invention

The present invention relates to an extractant and an extraction process. More particularly, the invention relates to an extractant useful for extracting metal ions.

2. Description of the Related Art

The platinum group metals (PGMs) are exceedingly rare in nature with average crustal quantities of only a few fractions of a part-per-million (ppm). Only a few large deposits of platinum group metals are known to exist and these deposits are located in South Africa and Russia. Smaller quantities of PGMs are obtained from the anode slimes produced during the electrorefining of nickel and from a few small mineral deposits variously located around the world. The growing demand for platinum group metals and other precious metals in high-technology applications has generated a demand for methods and processes for extracting and recycling these materials, especially from spent catalysts and from electronic scrap. It is important that PGMs be recycled because of the limited natural supply of these elements.

PGMs are used as catalysts in the chemical and automotive industry and as oxidation resistant coatings in the electronics sector. Many of these uses, especially the catalytic uses, are ideal for recovering the PGMs because the spent catalyst may be easily processed for metal recovery as part of the disposal process for the spent catalysts. Therefore, there is an interest in improving the methods and processes used for recovering PGMs by making these methods and processes faster and more efficient.

Using traditional smelting techniques to treat materials such as spent catalysts or electronic scrap is not always effective due to the refractory nature and low precious metal content of the spent catalysts and electronic scrap. Leaching spent catalysts and other scrap materials with acidic chloride solutions containing an oxidizing agent is effective in removing the precious metals and has the added advantage of preserving valuable substrates for recycling. However, the recovery and subsequent separation of precious metals, including PGMs, from the chloride feed liquors constitutes a difficult problem because these liquors often contain only low levels of precious metals (ppm levels) but high levels (on the order of grams per liter) of base metals such as iron, copper, zinc, tin, and nickel. Moreover, the volumes of solutions generated from the acid recovery of precious metals from spent catalysts and the like are large compared to the volume of highly concentrated solutions generated from typical precious metal refining. Classical precipitation techniques are inefficient when applied to such solutions and these classical techniques are being replaced by modem separation methods such as solvent extraction processes.

Solvent extraction, sometimes referred to as liquid ion exchange extraction, takes place in two steps. In the first step, the extraction step, a dilute aqueous feed solution containing the metal ion to be recovered is mixed with an immiscible hydrocarbon carrier containing an extractant dissolved therein. When the metal ion contacts the extractant, a metal complex is formed that migrates to the organic phase. In the second step, the stripping step, the "loaded" organic phase, which has been separated from the aqueous feed solution, is mixed with another aqueous solution of a stripping agent (e.g., sulfuric acid) wherein the metal ion passes to the aqueous stripping phase. Therefore, the extraction process converts a dilute feed solution of metal ions into a highly concentrated solution of the precious metal ions from which the metals may be more readily recovered, e.g., by electrolysis. The barren organic phase may then be recycled through the system if desired.

Monoquaternary ammonium salts or ammonium salts have been somewhat effective in recovering platinum group metals from acidic process streams containing base metals such as nickel and cobalt. Monoquaternary ammonium salts contain a positively charged nitrogen atom having four groups bonded to the nitrogen atom, and another atom or substituent that neutralizes the positive charge, typically a hydroxide or a chloride. However, the monoquaternary ammonium salts currently used in separation processes are not highly selective, although some selectivity has been achieved by modifying the substituent groups on the quaternized nitrogen atom or by carefully selecting the organic solvent used as a diluent. A monoquaternary ammonium salt currently being used in extracting PGMs is N-methyl-N,N-dioctyl-1-octanaminium chloride. (Available as ALIQUAT 336, a registered trademark of the Henkel Corporation of Germany).

In extracting PGMs from an aqueous acidic solution using a monoquaternary ammonium salt, the monoquaternary ammonium salt is first dissolved in a predominately water-immiscible or organic phase, such as 1-octanol. The aqueous and the organic solutions are then intimately mixed to allow the dissolved quaternary ammonium salt salt to form an ion pair with the PGM and transfer the desired PGM species from the aqueous phase into the organic phase. The two phases can then be separated and the extracted anion recovered from the organic phase.

A monoquaternary ammonium salt has also been adsorbed onto an inert polymeric support, while still retaining its desirable anion exchange properties, by making a slurry of the quaternary ammonium salt in methanol with resin beads and slowly removing the methanol using a rotary evaporator, leaving the monoquaternary ammonium salt adsorbed onto the surface of the resin beads. Since the monoquaternary ammonium salt is not covalently attached, but only held by weak Van der Waals attractions, the selectivity in extracting PGMs is similar to that of the free monoquaternary ammonium salt. In extraction systems, it is preferable for the extractant to be immobilized on a solid support because it eliminates the need for an organic solvent, thereby making processing simpler with fewer environmental concerns.

What is needed is a more selective extractant compound for extracting precious metals, such as PGMs, from acidic solutions. It would be an advantage to provide a method for designing an efficient extraction compound having a high selectivity for a particular precious metal, such as a PGM. It would be desirable if the extractant were provided as a solid that is substantially insoluble in aqueous solutions containing the one or more target PGMs. It would be even further desirable to have a process for recovering the PGMs from an extractant/PGM complex.

SUMMARY OF THE INVENTION

One embodiment of the present invention provides a method for selectively extracting one or more metal anion complexes from an aqueous solution, the method comprising contacting the aqueous solution with solids of one or more diquaternary ammonium salts, wherein the one or more diquaternary ammonium salts have two quaternary nitrogens spaced apart at a distance of less than about 10 Å, selectively binding the one or more metal anion complexes to the one or more diquaternary ammonium salts; and removing the diquaternary ammonium salts having the selectively bound metal anion complexes from the aqueous solution.

The method may be used to extract one or more platinum group metals, preferably platinum, palladium, rhodium, and combinations thereof. The diquaternary ammonium salts may selectively extract desired metal anion complexes from an aqueous solution containing the desired metal anion complexes as well as the anions or anion complexes of contaminant metals. The contaminant metals may be, for example, selected from Pb, Al, Ba, Ce, Zr, Fe, Cu, Co, Ni, Mo, Sn, Sb, As, Bi, Zn, Na, K, Ca and combinations thereof. Examples of valuable metals that the diquaternary ammonium salts may selectively extract are selected from Ag, Au, Pd, Rh, Pt, Ru, Os, Ir, and combinations thereof. Preferably, the diquaternary ammonium salts are used to selectively extract one or more metal anion complex, wherein the distance between the two quaternary nitrogens allows the two quaternary nitrogens to simultaneously interact with the one or more metal anion complex. In other words, the one or more metal anion complex that has been targeted to be selectively extracted should have a size compatible with forming a complex between the two quaternary nitrogens. It is believed that this simultaneous interaction or complexing occurs when the spatial distance between the two quaternary nitrogens is within about 5 Angstroms of the size of the complex, either greater or smaller.

The method is not limited to any particular pH of the aqueous solution, but metals are typically dissolved in acidic solutions. These acidic aqueous solutions may contain an acid selected from hydrochloric acid, sulfuric acid, nitric acid, any other acid that may dissolve the metals to be extracted, and combinations thereof. The acid concentration may be of any concentration that dissolves the metal to be extracted. The diquaternary ammonium salts effectively extract valuable metals at any acid concentration. However, it should be emphasized that an important advantage of the present invention is that any solution that contains dissolved metal anion complexes to be extracted is suitable for the method of the present invention, whether the solution is a base solution, a neutral solution or an acidic solution. Any amount of the solid diquaternary ammonium salts may be disposed in contact with the aqueous solution containing the desired or target metal anion complexes.

The preferred diquaternary ammonium salts are diquaternary ammonium halides that are substantially insoluble in water. The diquaternary ammonium salts must provide a distance between the two quaternary nitrogens that allows the formation of a complex between both quaternary nitrogens and the one or more metal anion complex to be selectively extracted. This complex between the diquaternary ammonium salts and the one or more metal anion complex may be formed when the two quaternary nitrogens are separated by a structure including, without limitation, an alkyl chain that may be either saturated or unsaturated and either straight or branched, either aromatic or aliphatic, a cyclic or heterocyclic ring structure that may be either saturated or unsaturated and either substituted or unsubstituted. In the simplest embodiments, the structure that links the two quaternary nitrogens will having from about 2 to about 8 carbon atoms coupling or separating the two quaternary nitrogens, although additional carbon atoms may be present in sides chains or portions of the ring structure that do not affect the spacing of the nitrogens. It is the spacing of the two quaternary nitrogens that is most important, and the foregoing structures between the two quaternary nitrogens should be construed to include all possible hydrocarbon structures. While the halogen may be fluorine, chlorine, bromine or iodine, the halogen is preferably selected from iodine and chlorine.

The methods of the present invention are not limited to disposing the solid diquaternary ammonium salts directly into the aqueous solvent. Alternatively, the diquaternary ammonium salts may be immobilized on a solid surface, such as a resin or a polymer, or otherwise secured in a column. In this embodiment, the aqueous solution is mixed with or flows over the solid phase having the attached diquaternary ammonium salts, wherein the diquaternary ammonium salts extract the metal anion complexes from the aqueous solution. The diquaternary ammonium salts may be bonded to the solid surface by adsorption or by chemical bonding.

Yet another embodiment of the present invention further provides a method for first selectively extracting a palladium anion complex from a mixture of metal anions and/or anion complexes with an iodide and then selectively extracting other metal anion complexes with the diquaternary ammonium salts. The method comprises dissolving the metals into an acidic solution, contacting the acidic solution with an iodide, separating the PGM complex from the acidic solution using octanol or other suitable organic solvent, contacting the acidic solution with the diquaternary ammonium salt dissolved in an organic solvent, wherein the distance between two diquaternary nitrogens is less than about 10 Å, selectively binding the Pt anion complexes to the diquaternary ammonium salt, and then separating the Pt-diquaternary ammonium salt complex from the aqueous solution. The iodide may be either an organic iodide, such as a diquaternary ammonium iodide, or an inorganic iodide, such as potassium iodide.

The foregoing and other objects, features and advantages of the invention will be apparent from the following more particular description of a preferred embodiment of the invention, as illustrated in the accompanying drawing wherein like reference numbers represent like parts of the invention.

BRIEF DESCRIPTION OF THE DRAWINGS

FIG. 3A–3C is a table showing the calculated values for different properties of the synthesized diquaternary ammonium salts.

DETAILED DESCRIPTION OF A PREFERRED EMBODIMENT

Figure 1:
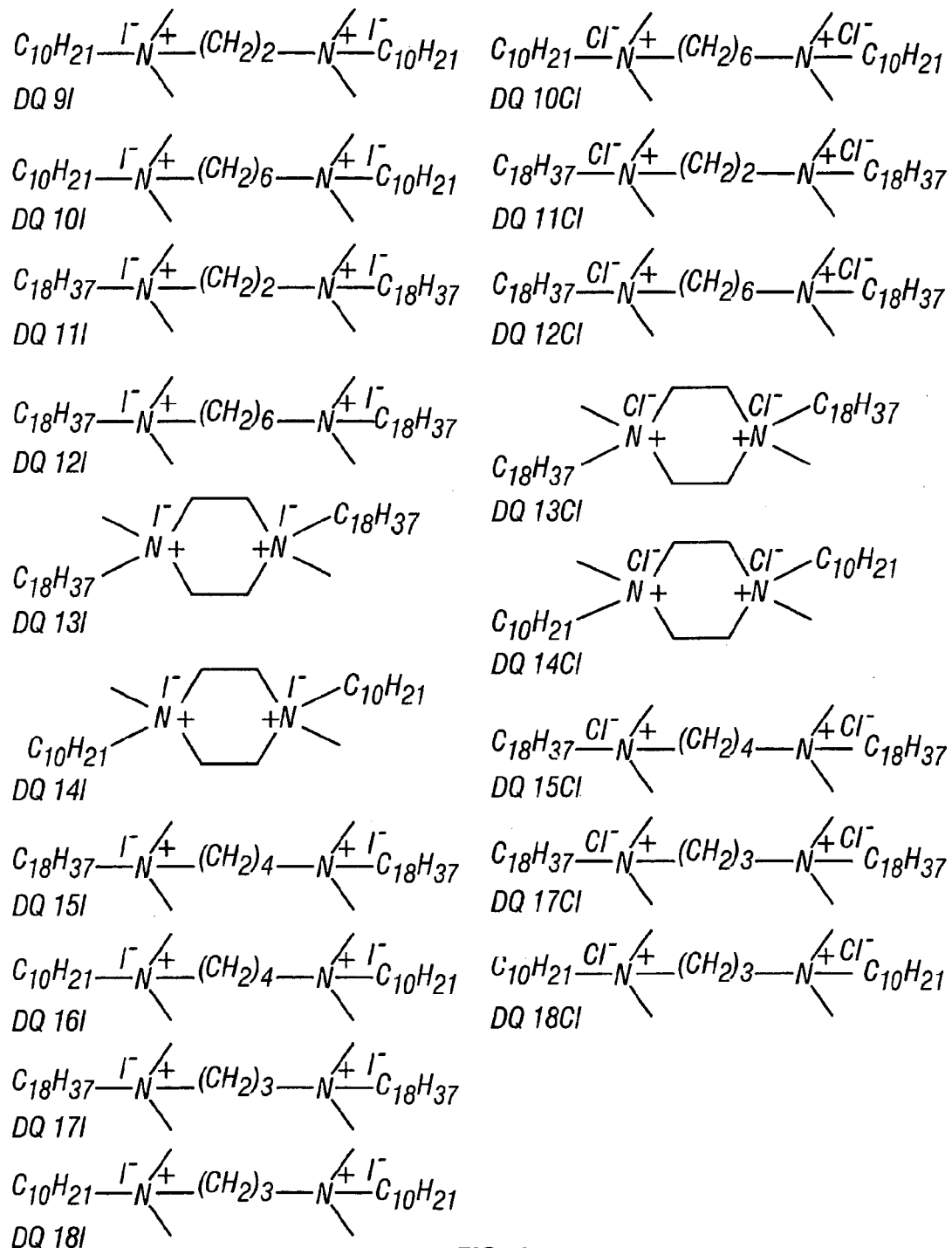
FIG. 1 shows the structures of the diquaternary ammonium salts that were synthesized.

One embodiment of the present invention provides a method for using a diquaternary ammonium salt compound or extractant to extract an anion complex of a platinum group metal or other metal from an aqueous solution. The diquaternary ammonium salt compounds of the present invention have tailor-made properties that enhance their ability to extract a platinum group metal or other metal from aqueous solutions. Platinum group metals (PGM) include platinum, palladium, rhodium, iridium, ruthenium and osmium. The interaction between a diquaternary ammonium salt compound of the present invention and a metal anion complex is specific based upon a favorable spatial arrangement so that the metal anion complex may be bound selectively, providing a strong interaction that binds the metal anion complex to the diquaternary ammonium salt as a stable pair.

The strong interaction and the favorable spatial arrangement provided by a diquaternary ammonium salt of the present invention is achieved by linking two quaternary nitrogens together with a short aliphatic carbon chain or a small ring, thereby forming a diquaternary ammonium salt compound that provides a strong interaction and a favorable spatial arrangement with the target metal anion complex. Optionally, it should be noted that the chain or the ring may be saturated or unsaturated. By changing the length or size of the chain or ring between the two quaternary nitrogens, different diquaternary ammonium salt compounds may be synthesized having desired spatial arrangements, because the longer the chain or the larger the ring, the farther apart will be the two nitrogens in the resulting diquaternary ammonium salt. Therefore, to extract a larger metal anion complex, a diquaternary ammonium salt may be designed having a longer chain or a larger ring. To extract a metal anion complex having a smaller size, a diquaternary ammonium salt may be designed having a shorter chain or a reduced ring size. Because the diquaternary ammonium salt "grips" the metal anion complex between the two quaternary nitrogen atoms, if the complex is significantly smaller than the space between the nitrogen atoms, then the anion will not be selectively extracted because the complex is not large enough to interact with both nitrogen atoms at the same time, but only by the lesser attraction of whichever one is closer. Conversely, if the metal anion complex size is much larger than the space between the nitrogens, then the metal anion complex may be less selectively extracted since the complex will not be attracted strongly between the nitrogen atoms. However, because a larger-size metal anion complex may still interact with both nitrogen atoms, some selectivity seems to be retained so long as the size of the metal anion complex can still interact with both of the nitrogens of the diquaternary ammonium salt. The spatial characteristics of the distance between the two positively charged nitrogen ions thereby leads to a degree of shape and/or size selectivity for specific metal anion complexes.

The distance between the two quaternary nitrogens does not decrease linearly with a decrease in the number of methylene groups separating them. The distance between two quaternary nitrogens separated by five methylene groups was found to be 7.55 Å decreasing to 3.57 Å with only two methylene groups. The distance was found to be 3.03 Å with a cyclical piperazine derivative. The distance between the nitrogens also changed as a function of the substituent groups attached to the nitrogen. In comparison, the average ionic size of the platinum metal halide compounds has been predicted to be about 3 Å.

The diquaternary ammonium salts used as extractants in the present invention were synthesized by combining tertiary diammonium salts with a stoichiometric molar excess of alkyl halides to produce diquaternary ammonium halides. The preferred alkyl halides are the alkyl chlorides, such as 1-Chloro octadecane or 1-Chlorodecane, or the alkyl iodides, such as 1-Iodo octadecane or 1-Iododecane. The alkyl halides should be selected to ensure that the diquaternary ammonium salts have low water solubility, such as an alkyl halide having ten carbon atoms. If the starting tertiary diammonium salts already have low water solubility, or if the extraction process does not require the diquaternary ammonium salt to facilitate separation from the aqueous phase during the extraction process, then other alkyl halides with fewer carbon atoms would be suitable. However, in the examples disclosed herein, water insolubility of the diquaternary ammonium salt is ensured by including an alkyl halide with an alkyl group having at least ten carbon atoms. In general, the same side chains that improve diquaternary ammonium salt solubility in an organic solution, as for example in a solvent/solvent extraction, will similarly serve to improve diquaternary ammonium salt insolubility in an aqueous solution, as for example in a solid/solvent extraction.

Exemplary diquaternary ammonium halides may be prepared by the following synthesizing schemes:

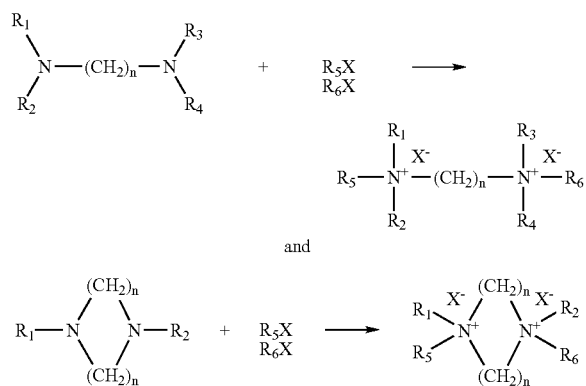

wherein $R_1$–$R_6$ are each independently selected from hydrogen and organic groups, and wherein n is an integer from 2 to about 8. Aromatic diquaternary ammonium salts would be similarly synthesized. In accordance with the invention, the molecular connection between the two diquaternary ammoniums may be either saturated or unsaturated and either straight or branched, or the ring between the two diquaternary ammoniums may be either saturated or unsaturated and either substituted or unsubstituted.

The prepared diquaternary ammonium salts were precipitated as white solids. Some of the solid diquaternary ammonium salts were stored in capped vials in a lab room at room temperature for up to six months. No degradation or decomposition of the diquaternary ammonium salts was observed during these six months nor was the extracting ability of the stored diquaternary ammonium salts affected when compared with freshly prepared compounds. The diquaternary ammonium salts of the present invention therefore appear to be very stable compounds that can be stored for long periods of time without degrading.

The diquaternary ammonium salts thus synthesized are useful for extracting platinum group metals and other precious/valuable metals from aqueous solutions, preferably acidic solutions, wherein the metals typically form metal anion complexes. The method is not limited only to extracting metal anion complexes from acidic solutions, but includes extracting metal anion complexes from any aqueous solution having any pH. The extraction method comprises contacting the aqueous solution with the diquaternary ammonium salts so that the metal anion complexes may come into contact with the diquaternary ammonium salts, wherein a complex is formed between the diquaternary ammonium salt and the metal. In effect, the complex allows the diquaternary ammonium salt to "capture" or extract the metal from the aqueous solution. After the aqueous solution has contacted the diquaternary ammonium salt for a sufficient time, a separation step is required wherein the diquaternary ammonium salt, leaving the metals with the diquaternary ammonium/metal anion complex is separated from the aqueous solution. If the diquaternary ammonium salt is dissolved in an organic solvent that is not miscible with water, then the separation is achieved by separating the aqueous solution from the immiscible organic solution. However, it is also possible to contact the aqueous solution with insoluble diquaternary ammonium salt solids.

Alternatively, the diquaternary ammonium salt may be immobilized on a resin or other surface of an inert substrate or polymer, wherein the separation step involves separating the aqueous solution from a solid phase having a surface on which the diquaternary ammonium salts are either adsorbed or chemically bonded. The diquaternary ammonium salts may be adsorbed onto the surface as described above for a monoquaternary ammonium salt or chemically bonded to a resin bead or similar inert substrate or polymer by including a specially functionalized substituent in the diquaternary ammonium salt that can chemically bond to a polymer backbone during polymerization or be chemically attached later on to the inert substrate. For example, in synthesizing the diquaternary ammonium salt, the substituent added to the tertiary ammonium salts to synthesize the diquaternary ammonium salt may include an additional active substituent, such that after the diquaternary ammonium salt is synthesized, the active substituent may be brought into contact with a polymer and then bind itself to the polymer under favorable reaction conditions.

When the diquaternary ammonium salt is dissolved in an organic solvent to facilitate the separation step of the extraction method, any organic solvent that is immiscible with water would be suitable. A preferred organic solvent is 1-octanol for most of the diquaternary ammonium salts. However, to improve the solubility for some of the diquaternary ammonium salts in 1-octanol, the addition of chloroform and/or methanol is helpful. A more preferred organic solvent is chloroform because using chloroform as the solvent improves the extraction of precious metals from the aqueous solution. Table 1 presents a table showing the effect of solvent selection on the extraction of rhodium and platinum using selected diquaternary ammonium salts. Organic solutions of the diquaternary ammonium salts may have concentrations up to saturation, preferably up to about 10 wt % diquaternary ammonium salts. More preferably, the concentrations will range from 0.5 wt % to about 5 wt %. Most preferably, the concentrations will range from about 1 wt % to about 5 wt %.

TABLE 1

| DQ ID | Chloroform | Octanol |
|---|---|---|
| Percent Rh III Removed from a 3M HCl Solution | | |
| 9 I | 88.35 | 63.92 |
| 11 I | 87.48 | 63.40 |
| 17 I | 87.00 | 59.73 |
| Percent Pt III Removed from a 3M HCl Solvent | | |
| 10 Cl | 98.46 | 89.50 |
| 11 Cl | 96.77 | 53.56 |
| 12 Cl | 91.42 | 77.14 |

TABLE 1-continued

| DQ ID | Chloroform | Octanol |
|---|---|---|
| 13 Cl | 98.14 | 99.86 |
| 14 Cl | 99.45 | 97.61 |

The required contact time between the diquaternary ammonium salt and the aqueous solution during the extraction process is determined by the kinetics of the extraction process. It is desirable to carry out an extraction process in as short a time period as possible to minimize the operating costs. Preferably the contact time between the organic and aqueous solutions is less than 30 minutes, more preferably less than 20 minutes, and most preferably between about 5 minutes and about 20 minutes.

The metals that may be extracted using this method include platinum group metals and other precious metals. The metals include, for example, platinum, palladium, rhodium, iridium, osmium, ruthenium, gold, silver and combinations thereof. However, the method of the present invention is not limited only to these metal anion complexes but may be used to extract any desired metal anion complex that is attracted to the quaternary nitrogen atoms and that has a metal anion complex size similar to the distance between the two quaternary nitrogen atoms.

Recovering precious metals from spent catalysts, electronic scrap and other similar sources include mixing these precious metal-containing materials with a strong acid, such as sulfuric acid, nitric acid and/or hydrochloric acid to dissolve the metals into an aqueous acidic solution from which the metals may be extracted through an extraction process. While traditionally these metals are dissolved in acidic solutions, the present method is not limited to recovering metal anion complexes only from acidic solutions, but from an aqueous solution having any pH. The resulting acidic solutions containing the precious metals to be extracted will also contain contaminant metals and other materials dissolved by the acid from the spent catalyst and electronic scrap. These contaminant metals often have a higher concentration level in the acidic solution than the desired precious metals, and may include Pb, Al, Ba, Ce, Zr, Fe, Cu, Co, Ni, Mo, Sn, Sb, As, Bi, Zn, Na, K, Ca and combinations thereof.

Figure 2:
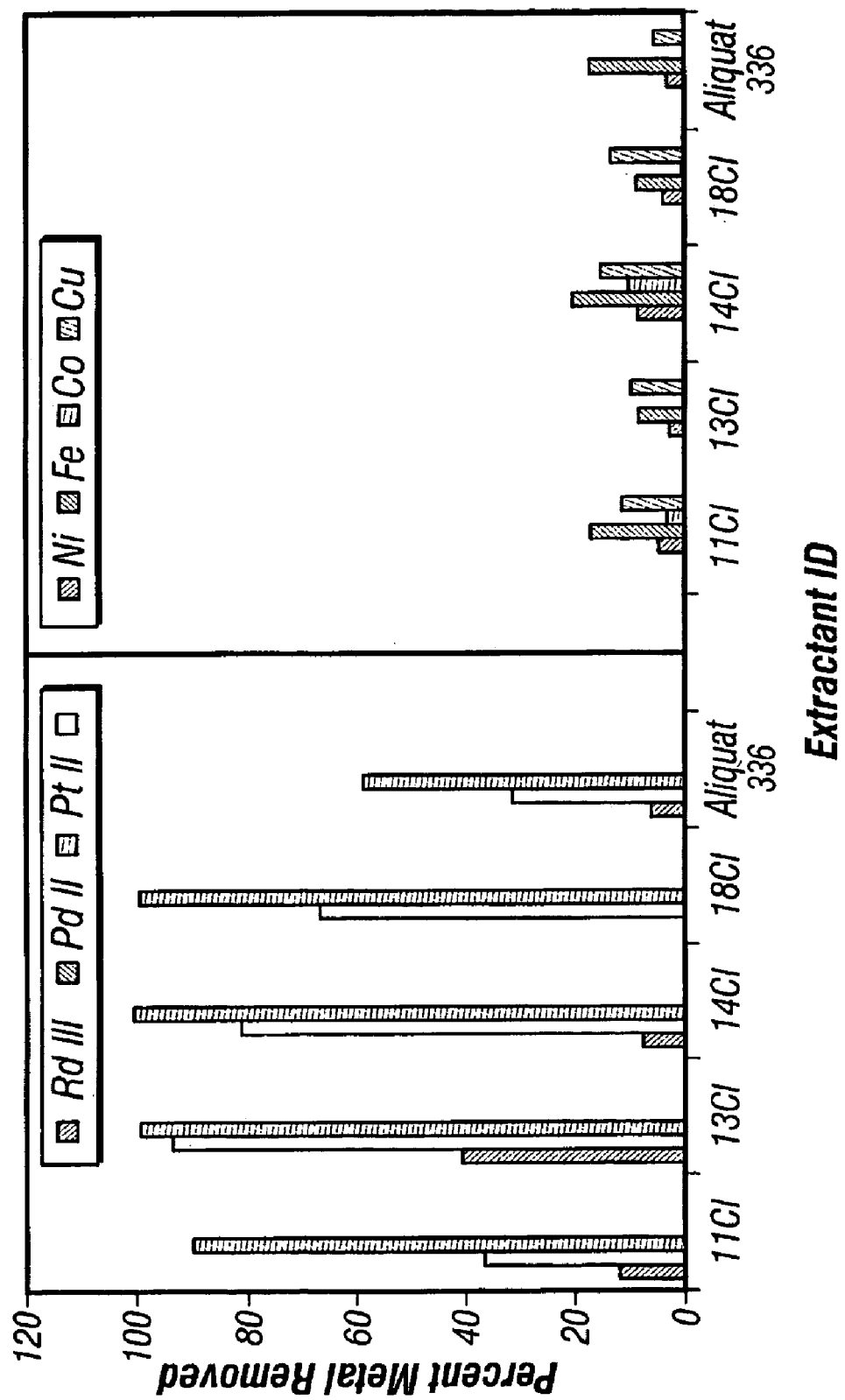
FIG. 2 is a graph showing the percent metal extracted from an aqueous solution containing Rh, Pd, Ni, Fe, Co, and Cu for selected extractants.
Figure 4A:
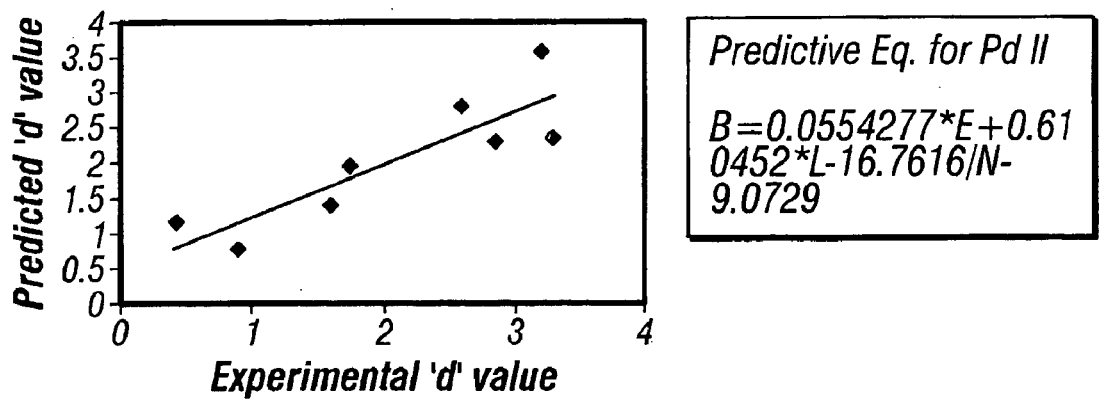
FIGS. 4A–4E are graphs of equations that may be used to predict selectivity of structurally related diquaternary ammonium salts for Pd II, Pd IV, Pt II, Pt IV and Rh III.
Figure 4B:
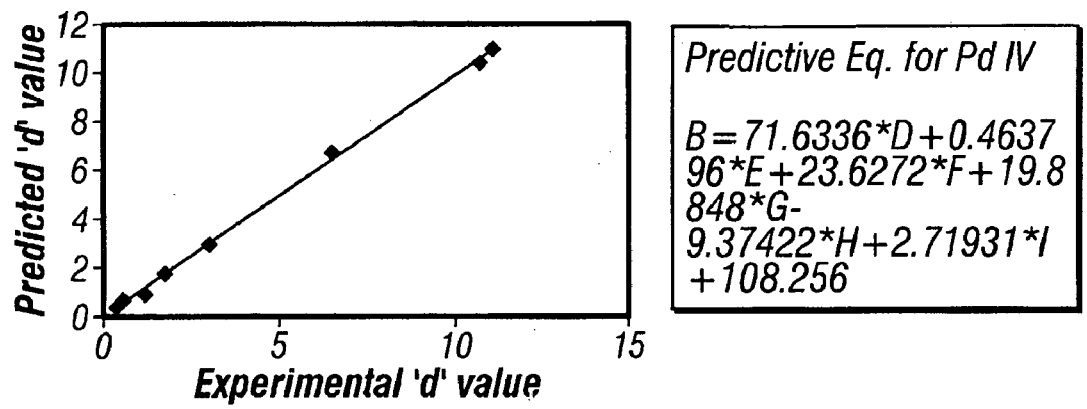
Figure 4C:
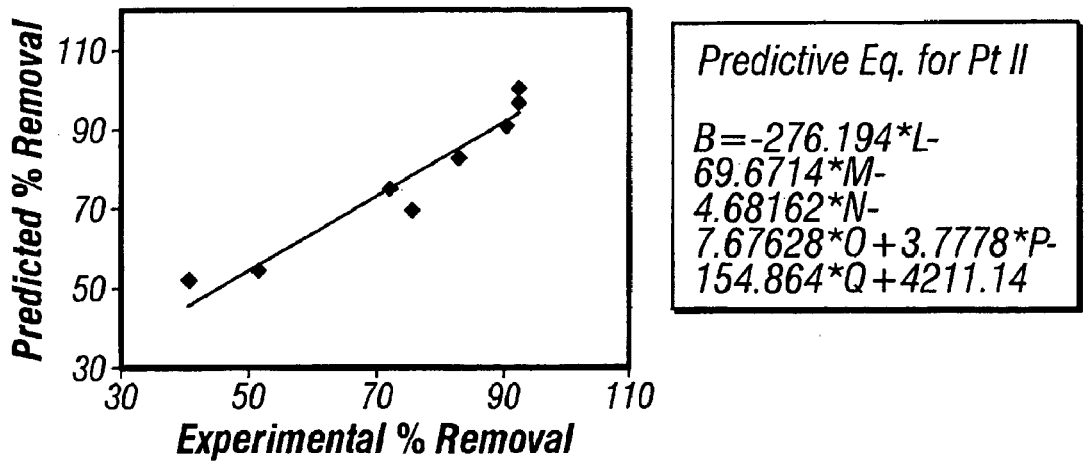
Figure 4D:
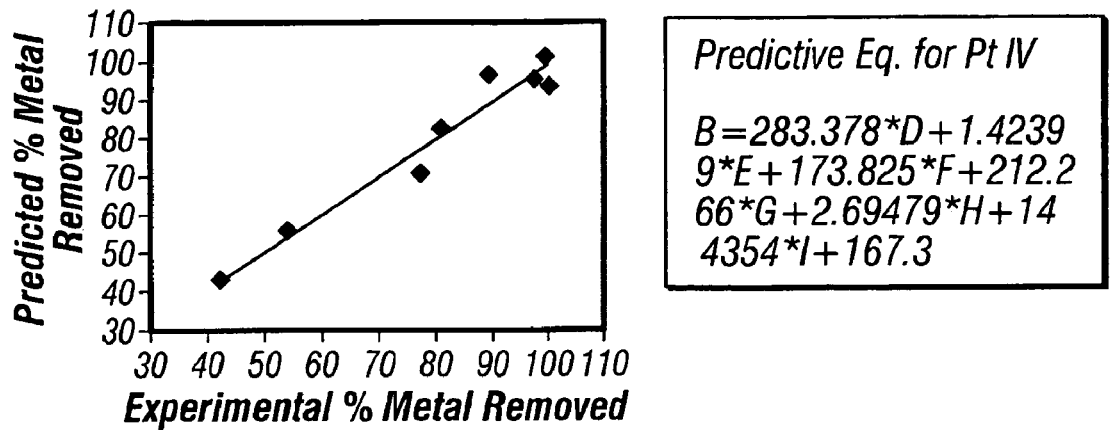
Figure 4E:
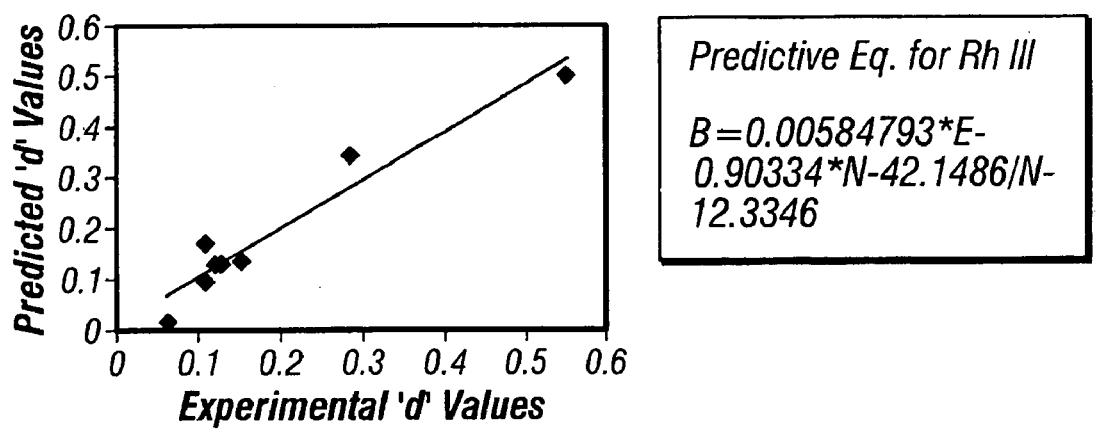

Selected diquaternary ammonium salts have shown good binding selectivity between one or more targeted metal anion complexes and contaminant metal anions or anion complexes when tested in aqueous solutions containing anion complexes of Rh, Pd, Ni, Fe, Co, and Cu. FIG. 2 is a graph showing the percent metal extracted from an aqueous solution containing anion complexes of Rh, Pd, Ni, Fe, Co, and Cu for selected diquaternary ammonium salts of the present invention, as well as the commercially available monoquaternary ammonium salt ALIQUAT 336. The metals were extracted from a 3 M hydrochloric acid (HCl) solution containing 50 ppm of each of the metal components using organic solutions having the selected diquaternary ammonium salts in concentrations of 2.5 wt %.

The acidity of the aqueous solution may affect the efficacy of the extraction process when using the diquaternary ammonium salts. When the target metal is platinum or rhodium, the diquaternary ammonium salts extracted the target metal over a wide range of acidity, with some diquaternary ammonium salts performing better than others for a given acidity. A lower acidity is preferred for extracting palladium. Tables 2 through 4 show the effect that the acidity of the aqueous solution has on the ability of selected diquaternary ammonium salts to extract platinum, palladium and rhodium. Table 2 shows the effect of differing acid concentrations on the performance of selected diquaternary ammonium salts in extracting Pd II and Pd IV from a 50 ppm solution of the metal. Table 3 shows the effect of differing acid concentrations on the performance of selected diquaternary ammonium salts in extracting Pt II and Pt IV from a 50 ppm solution of the metal. Table 4 shows the effect of differing acid concentrations on the performance of selected diquaternary ammonium salts in extracting Rh III from a 50 ppm solution of the metal.

TABLE 2

| Diquat ID | 0.5 M HCl Pd II | 3 M HCl Pd II | 10 M HCl Pd II | 0.5 M HCl Pd IV | 3 M HCl Pd IV | 10 M HCl Pd IV |
|---|---|---|---|---|---|---|
| 10 Cl | NA | 63.62 | 25.66 | 99.46 | 86.48 | 28.29 |
| 13 Cl | 63.22 | 76.31 | 39.16 | 98.00 | 91.69 | 35.55 |
| 14 Cl | 98.54 | 72.25 | 55.27 | 99.11 | 74.75 | 51.20 |
| 18 Cl | 99.68 | 74.06 | 53.87 | 99.76 | 91.39 | 49.21 |
| Aliquat 336 | 85.22 | 27.25 | 49.93 | 77.87 | 28.52 | 34.27 |

TABLE 3

| Diquat ID | 0.5 M HCl Pt II | 3 M HCl Pt II | 10 M HCl Pt II | 0.5 M HCl Pt IV | 3 M HCl Pt IV | 10 M HCl Pt IV |
|---|---|---|---|---|---|---|
| 10 Cl | 99.82 | 89.50 | 99.82 | 98.91 | 97.45 | 98.91 |
| 13 Cl | 99.80 | 99.86 | 99.80 | 100.00 | 100.00 | 100.00 |
| 14 Cl | 100.00 | 97.61 | 100.00 | 100.00 | 100.00 | 100.00 |
| 18 Cl | 100.00 | 100.00 | 100.00 | 100.00 | 97.65 | 100.00 |
| Aliquat 336 | 96.82 | 46.25 | 96.82 | 86.21 | 63.54 | 86.21 |

TABLE 4

| Diquat ID | 0.5 M HCl Rh III | 3 M HCl Rh III | 10 M HCl Rh III |
|---|---|---|---|
| 11 Cl | 2.85 | 12.99 | 12.28 |
| 13 Cl | 24.54 | 35.61 | 20.04 |
| 14 Cl | 14.70 | 22.05 | 30.84 |
| 18 Cl | 0.0 | 9.64 | 11.50 |
| Aliquat 336 | 2.77 | 0.00 | 0.00 |

Not all diquaternary ammonium salts are equally effective in extracting a given precious metal from an aqueous solution. Table 5 illustrates the selectivity demonstrated by certain diquaternary ammonium salt chlorides in extracting metal anion complexes from an aqueous solution containing equal concentrations of the metals anion complexes. As shown in Table 5, the diquaternary ammonium salts were most effective in extracting Pt, with Pd being the next most successful metal to be extracted. Rhodium was the least successful to be extracted. However, it should be noted that the diquaternary ammonium salts having a theoretical distance of 3.03 Å, 3.10 Å, 5.21 Å, and 5.36 Å between the two quaternary nitrogens performed best in extracting the metal halide complexes having an estimated size of about 3 Å. This supports the present conclusion that the performance of the diquaternary ammonium salts in extracting metal anion complexes from an aqueous solution depends on the distance between the quaternary nitrogens. Therefore, diquaternary ammonium salts may be designed to selectively extract metals from a solution based upon the size of the metal anion complexes targeted for extraction.

TABLE 5

| Diquat ID | Theoretical distance between two nitrogens Å | Rh % Extracted | Pt % Extracted | Pd % Extracted |
|---|---|---|---|---|
| 10 Cl | 8.3 | 0 | 86 | 76.62 |
| 11 Cl | 3.68 | 0 | 61.64 | 41.26 |
| 12 Cl | 8.6 | 0 | 53.31 | 53.02 |
| 13 Cl | 3.03 | 21.94 | 100 | 95.67 |
| 14 Cl | 3.10 | 1.95 | 100 | 88.00 |
| 15 Cl | 0.66 | 0 | 38.49 | 26.49 |
| 17 Cl | 5.21 | 1.12 | 92.83 | 56.46 |
| 18 Cl | 5.36 | 0 | 98.63 | 80.71 |
| Aliquat 336 | | 0 | 39.01 | 30.05 |

As may be seen from Table 6, the diquaternary iodides were much better extractants for rhodium than the diquaternary chlorides.

TABLE 6

| | Diquat ID | | | | | | | | | |
|---|---|---|---|---|---|---|---|---|---|---|
| | 9 I | 10 I | 11 I | 12 I | 13 I | 14 I | 15 I | 16 I | 17 I | 18 I | Aliquat 336 |
| Rh III % Extracted | 88 | 47 | 87 | 50 | 86 | 71 | 64 | 69.7 | 87 | 57 | 30 |

The inventors have also discovered that iodide ions form a complex with the Pd ions in the aqueous acidic solution, rendering the Pd-iodide complex highly soluble in organic solvents. Therefore, Pd may be removed from an acidic aqueous solution simply with the addition of an iodide ion, such as provided by KI dissolved in a solvent such as octanol or chloroform. By adding the iodide, the palladium ions migrate to the organic phase from the aqueous phase, thereby providing an important tool for the separation of Pd from other precious and contaminant metals. The KI may be added to the aqueous solution or to the organic solvent used to recover the palladium, but preferably to the aqueous solution. Other inorganic or organic iodides are acceptable such as NaI, CaI, MgI, monoquaternary ammonium salt iodides, alkyl iodides and other organo iodides. The iodide concentration in the solvent is not critical but there should be a molar excess of the iodide relative to the metal anion complex. The organic solvent may be any organic solvent that dissolves the metal iodide and is immiscible in water. Contact time should be less than about 45 minutes, preferably between about 5 minutes and about 30 minutes.

A two step process for selectively extracting precious metals from spent catalyst taken from automobile catalytic converters is beneficial. Platinum and palladium are both used in catalytic converters and may be selectively extracted from an acidic solution containing these metals by using a two step process of the present invention. First, the palladium is removed by contacting the acidic solution with an organic solution containing iodide as described above. After separating the organic solution containing the palladium, the acidic solution is contacted with a diquaternary ammonium salt that selectively extracts platinum anion complexes. The diquaternary ammonium salt may be provided either as a solid or in a second organic solution.

Extracting palladium first by using iodide is beneficial because it allows the diquaternary ammonium salts to be used for extracting only the platinum. This provides a separation technique not only for extracting the precious metals from the contaminant metals, but also for obtaining the palladium separate from the platinum.

Quantitative Structure Activity Relationship (QSAR) analysis was used on the synthesized diquaternary ammonium salts to determine if there was a predictive relationship for determining whether a particular diquaternary ammonium salt, having a given carbon chain length and structure, would be successful as an extractant for specific precious metal anion complexes. The experimental data obtained for the 10 synthesized diquaternary ammonium salts was used to determine a quantitative relationship between the binding abilities of various diquaternary ammonium salts and their structural properties. The quantitative relationships derived herein from the limited experimental data available is not meant to be definitive, but demonstrates a method that may be used to design or identify a particular diquaternary ammonium salt that is suitable for selectively extracting a given metal anion complex or a group of metal anion complexes.

This quantitative relationship may be used to predict whether a given diquaternary ammonium salt would be a good extractant for a particular metal anion complex. To determine the quantitative relationship, various chemical, physical, topological and electronic descriptors are first calculated using empirical equations based upon the structure of the compound. Fifteen different properties were calculated with the results shown in FIG. 3A–3C.

Next, the experimental values from the solvent extraction experiments were converted into distribution ratios, or D Values. The D Values represent the ratio of the amount of metal ion concentration extracted in the organic phase versus the amount of metal ion concentration remaining in the aqueous phase, as defined by:

$$D=[PGM]_{org}/[PGM]_{aq}$$

Next, these D Values were plotted as experimental D Values on graphs as shown in FIGS. 4A through 4E. Correlations between the calculated properties shown in FIG. 3 and the D Values were determined and analyzed by viewing scatter plots. The properties that gave the best fits were used to generate multiple regression analysis columns. The resulting equations may be used to predict selectivity of structurally related diquaternary ammonium salts for future research and applications. FIGS. 4A through 4E further show the prediction equations for Pd II, Pd IV, Pt II, Pt IV and Rh III.

Example 1

Synthesis of Diquaternary Ammonium Salt Solids

Ten diquaternary ammonium salt iodides and eight diquaternary ammonium salt chlorides were synthesized in accordance with the present invention. Each of the synthesized diammonium salts was synthesized from one of the following five different diammonium salts: N,N,N,N-Tetramethylethylenediammonium salt (TMED), N,N,N',N'-Tetramethyl-1,3-propanediammonium salt (TMPD), N,N,N',N'-

Tetramethyl-1,4-butanediammonium salt (TMBD), N,N,N', N'-Tetramethyl-1,6-hexanediammonium salt (TMHD), or 1-4-Dimethylpiperazine (DMP). To synthesize one of the diquaternary ammonium salts, 10 mM (millimoles) of a diammonium salt selected from those listed above, was added to 25 ml of dimethyl formamide in a 200 ml round bottom flask. An alkyl halide was added to this solution at a molar excess of either 4 times or 6 times the stoichiometric requirement. For a stoichiometric molar excess of 4 times, 40 mM of 1-chloro octadecane (COD) or 1-iodo octadecane (IOD) was added. For a stoichiometric molar excess of 6 times, 60 mM of 1-chlorodecane (CD) or 1-iododecane (ID) was added. Then 0.2 g of sodium carbonate was added along with a stir bar.

The flask was then placed in a heated oil bath and magnetically stirred. The oil bath was maintained at 75° C. for the synthesis of iodide diquats and 115° C. for the synthesis of chloride diquats. The flask was capped with a 20° C. water-cooled reflux condenser, sealed with a rubber septum and vented with a syringe needle. The reaction mixture was then sparged with argon, heated, and stirred for 48 hours.

Synthesized iodide diquaternary ammonium salts were precipitated by the drop wise addition of the reaction mixtures in 100 ml of benzene while the synthesized chlorides were precipitated in a 50 ml:50 ml mixture of hexanes-benzene. The solutions were then kept cooled to −15° C. overnight. Precipitates were isolated by vacuum filtration on medium fine filter paper, washed with an additional 20 ml of respective solvent and then vacuum dried overnight. The dried diquat products were weighed, sealed in glass vials, labeled and stored at 5° C. until further use. Yields of the diquats were nearly quantitative and the overall yields of iodide diquats were higher than those of the chlorides. Two of the chloride diquats, referred to in FIG. 1 as 9C1 and 16C1, were unable to be precipitated out using these procedures. The diquaternary ammonium salts synthesized by this method are shown in FIG. 1. The identification numbers used to refer to the diquaternary ammonium salts in FIG. 1 was adopted for convenience and has no relevance to the actual structure of the diquats, except that "C1" refers to the chloride form of the diquat (abbreviated "DQ") and "I" refers to the iodide form of the diquat.

Example 2

Effect of Acid Strength on Extraction Efficiency

Selected diquaternary ammonium salts were used to extract PGMs from solutions of varying acidity to determine the effect of the PGM solution's acid strength on the efficacy of the extraction. Eight solutions were mixed, each containing 2.5 wt % of a selected diquaternary ammonium salt dissolved in an organic solvent comprising a mixture of octanol and chloroform. Acidic solutions of varying HCL molarity were mixed, each solution containing 50 ppm of one of the following metals: Pd II, Pd IV, Pt II, Pt IV, and Rh III. The HCL acid molarities were 0.5 M HCl, 3 M HCl, and 10 M HCl.

For each of the selected diquaternary ammonium salts, the extraction procedure involved contacting 5 ml of the. 2.5% diquaternary ammonium salt solution with 5 ml of one of the acidic mixtures of the PGMs in a 20 ml glass scintillation vial for 30 minutes with vigorous shaking. Phase separation was aided by centrifuging the mixture at 2500 rpm for three minutes. Using a Pasteur pipet, the aqueous phase was then removed, placed in another scintillation vial, and washed by contacting with 10 ml of chloroform (1 aqueous:2 organic) for one minute with vigorous shaking. Phase separation was again aided by centrifugation and the aqueous phase was removed, the volume determined, and then analyzed for residual PGM metal concentration determination. Rh and Pd concentrations were determined by Atomic Absorption Spectrometry and Pt concentrations by Inductively Coupled Plasma Atomic Emissions Spectrometry. The amount of metal extracted by the diquaternary ammonium salts into the organic phase was assumed to be the difference between the amount of metal in the aqueous phases before and after extraction.

The results, shown as percent of PGMs extracted, are shown in Tables 2–4. As can be seen from Table 2, the selected diquaternary ammonium salts were significantly better able to extract Pd II and Pd IV from the 0.5 M HCl solution than from the higher molarity solutions. As shown in Table 3, the selected diquaternary ammonium salts were each highly successful in extracting the Pt II and Pt IV from all the varying acid molarity solutions. However, as shown in Table 4, only two of the selected diquaternary ammonium salts, 13C1 and 14 C1, were successful in extracting a significant amount of Rh III from all the various acid molarity solutions.

The experiment also analyzed, as shown in each of Tables 2–4, the performance of ALIQUAT 336 in extracting metal anion complexes at differing acidity. ALIQUAT 336 is a monoquaternary ammonium salt that is used commercially to extract metals from an aqueous solution. In every case, the diquaternary ammonium salts performed significantly better than ALIQUAT 336. Especially in the case of extracting rhodium, selected diquaternary ammonium salts extracted from 22% to 30% of the rhodium present in the aqueous acidic solutions while ALIQUAT 336 only extracted from 0% to 3%. The results of this experiment show that by selecting a particular diquaternary ammonium salt as an extractant for a given acidity solution, significantly greater amounts of valuable metals may be extracted from the solutions than using traditional extractants.

Example 3

Selectivity of Selected Diquats

Experiments were conducted using selected diquaternary ammonium salts contacted with acidic solutions of PGMs to determine the relative selectivity of the selected diquaternary ammonium salts towards individual PGMs. An acidic solution of the PGMs was prepared with the solution containing 50 ppm each of Rh, Pd, and Pt. Using the extraction technique described in Example 2, 2.5 wt % solutions of the selected diquaternary ammonium salts, dissolved in either chloroform, 1-octanol or a mixture of the two, were each contacted with the prepared PGM solution. The results are shown in Table 5. The diquaternary ammonium salts were shown to be most effective when extracting Pt.

As shown in Table 5, four out of the eight diquaternary ammonium salts showed promising performance towards both Pt and Pd metals, but the best performance was obtained with 13C1 and 14C1. This fits with the theory that the performance of the diquaternary ammonium salts depends upon the number of methylenes, and hence the distance, between the two quaternary nitrogens. As shown in Table 5, for diquaternary ammonium salts 13C1 and 14C1, the distance between the quaternary nitrogens is about 3 Å. It should be noted that the average ionic size of the metal halide compounds has been calculated to be approximately 3 Å, thereby verifying that the spacing of the two quaternary nitrogens is responsible for causing 13C1 and 14C1 to be the best performers.

Again, as in the last example, ALIQUAT 336 was included as an extractant for analysis and comparison between the performance of ALIQUAT 336, the monoquaternary ammonium salt currently used to extract metals, and the diquaternary ammonium salts used as described in the present invention. As may be seen in Table 5, selected diquaternary ammonium salts extracted significantly more rhodium, platinum and palladium than the ALIQUAT 336 was able to extract.

Example 4

Extraction of PGMs

A catalytic converter from a car made in the United States was obtained from a junkyard. The converter was opened with a chop saw and two monoliths were removed. The back monolith was chopped into pieces and about 203 g of this material was contacted with 375 ml of concentrated HCL in a two-liter beaker. About 500 ml of water was added to cover the material completely and then heated to 50° C. for one hour. The solution was allowed to stand overnight, and then filtered to remove the particulates.

Figure 5:
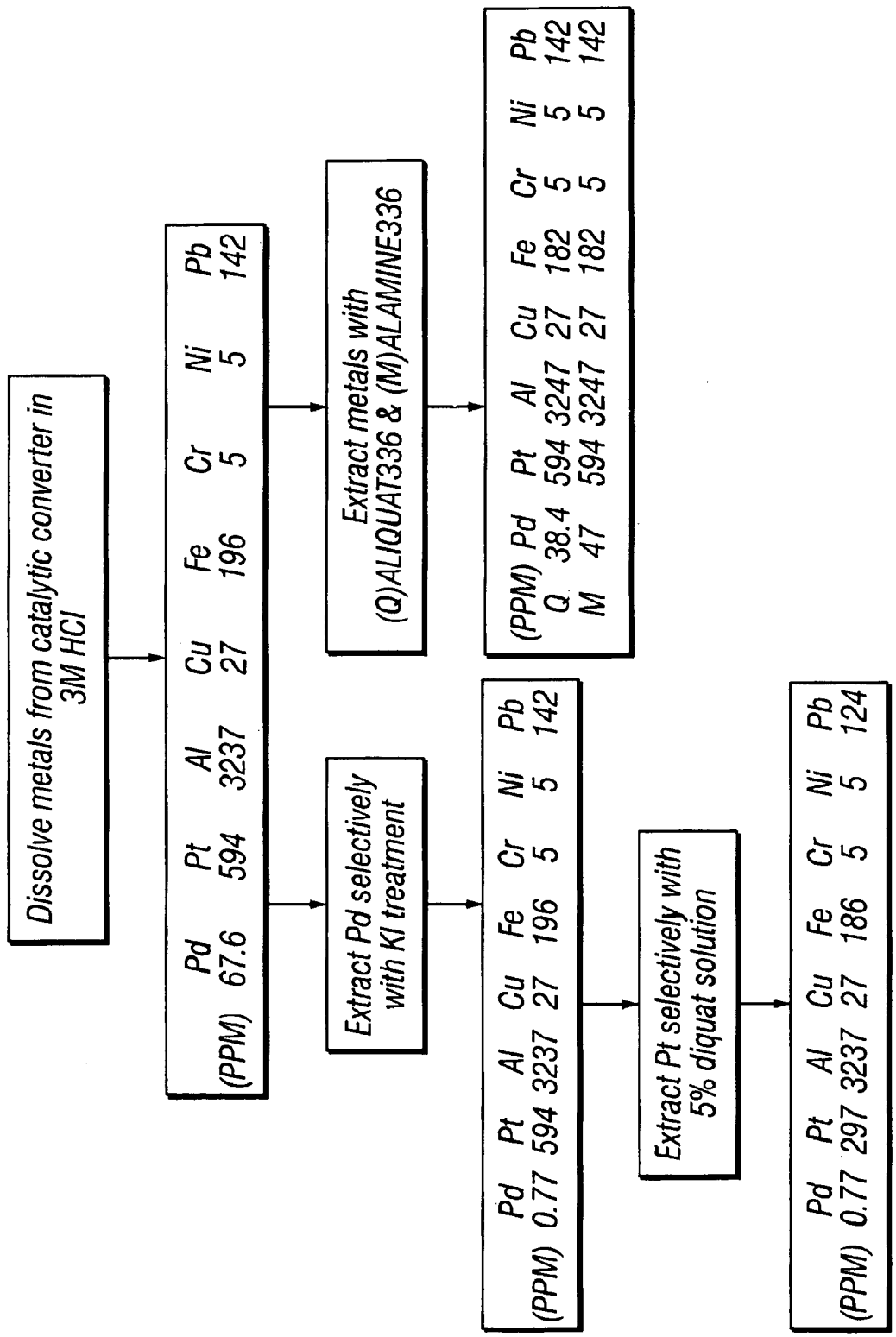
FIG. 5 is a chart showing the metal concentrations at different stages of a metal recovery experiment using an embodiment of the metal recovery method of the present invention.

The solution was analyzed to determine the concentrations of the metal ions present in the solution. The initial concentration of each of the metals is shown in FIG. 5. The acid molarity of the solution was estimated to be 3 M.

To remove the Pd from the solution, 120 ml of a solution made up of octanol and 0.024 g KI, was contacted with the acid solution for 30 minutes. After phase separation, four 10 ml portions were formed from the aqueous phase, the remainder being submitted for analysis. Each portion was separately contacted, by the extraction technique described in Example 2, with 10 ml of three different extractants: a 5% solution of the 13C1 diquaternary ammonium salt, a solution of ALIQUAT 336 and a solution of ALAMMONIUM SALT 336. (ALIQUAT 336 and ALAMMONIUM SALT 336 are both registered trademarks of the Henkel Corporation of Germany). After phase separation, the aqueous phases were removed and submitted for Pt and Pd analysis. The organic phases were treated with sodium borohydride to recover the extracted metals. The results are shown in FIG. 5.

As can be seen in FIG. 5, the addition of the KI resulted in the removal of 98% of the Pd from the solution. In the next step, extraction with a 5% diquaternary ammonium salt in solution with octanol/chloroform selectively removed about 50% of the Pt from the solution. The other contaminant metals present in the solution, in large excess over the PGMs, were mostly unchanged. By comparison, the commercial products traditionally used to extract metals from acidic solutions were only able to extract a small quantity of the Pd from the solution, while Pt was not extracted at all.

Example 5

Scaling Up Diquat Synthesis

Figure 6:
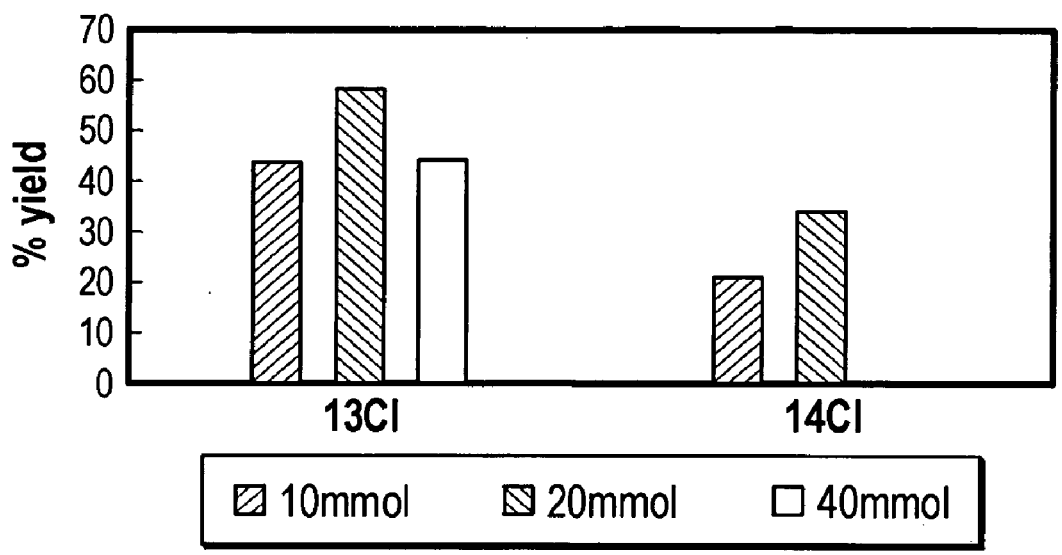
FIG. 6 is a chart showing the effect of scale up of synthesis on yields of the reaction.

The synthesis of diquaternary ammonium salts involved heating a solution of tertiary ammonium salts with alkyl halides in an appropriate solvent at about 110° C. for two days. 10 mmol of diammonium salt and 40 to 60 mmol alkyl halide were used for a synthetic reaction. Experiments were carried out to slowly increase the size of the batch in each reaction by two orders of magnitude (20 mmol scale and 40 mmol scale). During the scaling up, the yields of these reactions were determined and compared with small scale reaction. The results are presented in FIG. 6, showing that Diquats can be synthesized on a large scale without compromising the yield.

Efforts to increase the scale of synthesis were very successful. One major concern was the effect that scale-up could have on the yield of the reaction. As can be seen in FIG. 6, the yields of major diquats, DQ 13C1 and DQ 14C1 were constant or higher when they were scaled up. In the case of DQ 13C1, the yield of 40 mmol scale synthesis was not higher than that of 20 mmol scale. It was because the conditions of reaction such as reaction temperature, reaction time and solvents were not optimized yet. It was observed that some diquats are sensitive to heat and they were melting out during the vacuumed dry in an oven. So the synthetic condition was changed for them to vacuum dry these under room temperature condition.

Example 6

Back Extraction Using Three Different Acid Molarities 5 ml of 1M HCl was contacted with 5 ml of the diquaternary ammonium salt/PGM complex-containing organic phase in a 20 ml scintillation vial, shaken vigorously for 10 min. Phase separation was aided by centrifuge at 2500 rpm. The aqueous phase was removed using a Pasteur pipette. And 5 ml of 1M HCl was contacted with the organic phase again, following the same procedure. The total volume of two aqueous phases (hydrochloric acid) was measured and recorded for platinum concentration recovered. The aqueous phase was submitted for ICP analysis. Similarly 6M HCl and 12M HCl were used for back extraction.

Example 7

Precipitation of Zero-Valent PGMs Using Sodium Borohydride

Figure 7:
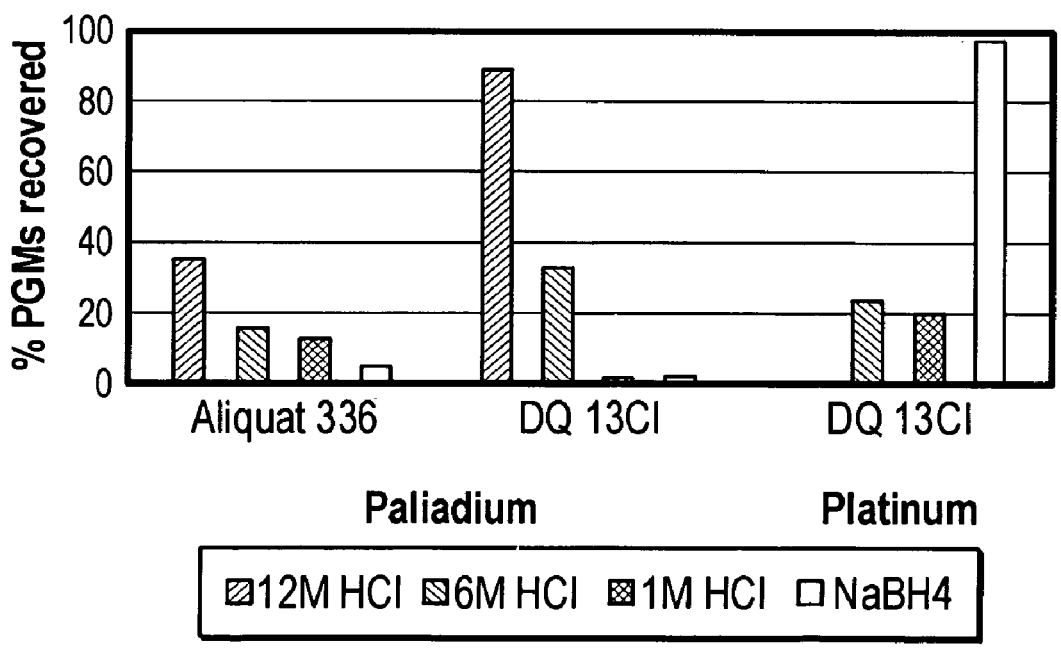
FIG. 7 is a chart comparing the percentage of PGMs recovered during back extraction experiments.

It is well known that $NaBH_4$ is a good reducing agent for metals. Therefore, $NaBH_4$ was used to obtain zerovalent PGMs from the organic solution. 0.15 g of $NaBH_4$ was added into 5 ml of the diquaternary ammonium salt/PGM complex-containing organic phase in a 40 ml vial. The vial was lightly swirled until bubbling and foaming ceased. The reduced PGMs were recovered into an aqueous phase by adding 5 ml of concentrated HCl and shaking the vial. Using a Pasteur pipette the aqueous phase was separated. The volume of aqueous phase and the amount of PGM in the aqueous phase was measured and recorded. The results from different back-extractions are presented in FIG. 7, showing that back-extraction of PGMs can be achieved effectively Four methods to strip PGMs from the organic phase were explored and the efficiency of each method was compared for palladium and platinum extraction. The four methods included three different molar concentrations of hydrochloric acid solutions as well as sodium borohydride employed to precipitate Pt or Pd in zerovalent stage. For platinum, $NaBH_4$ treatment resulted in the highest efficiency as 97% when compared to the other three methods (FIG. 7). DQ 13C1 in 12M HCl recovered 89.2% of palladium, and it was more than twice of that in 6M HCl. The efficiency of $NaBH_4$ precipitation for palladium was too low. 12M HCl showed the best results towards back extraction of PGMs (FIG. 7). It was observed that the back extraction step required only 5–10 minutes.

Example 8

Investigation of Reusability of Diquats for PGM Extraction

In a typical experiment, an organic solution of diquaternary ammonium salts was used for extraction of PGMs followed by a back extraction step using HCl. The organic diquaternary ammonium salt solution, now free of PGMs, was used again for extraction of PGMs from an aqueous solution, and the process was repeated three times. The efficiency of PGM extraction was determined in each cycle. The details are given in the following section.

Figure 8:
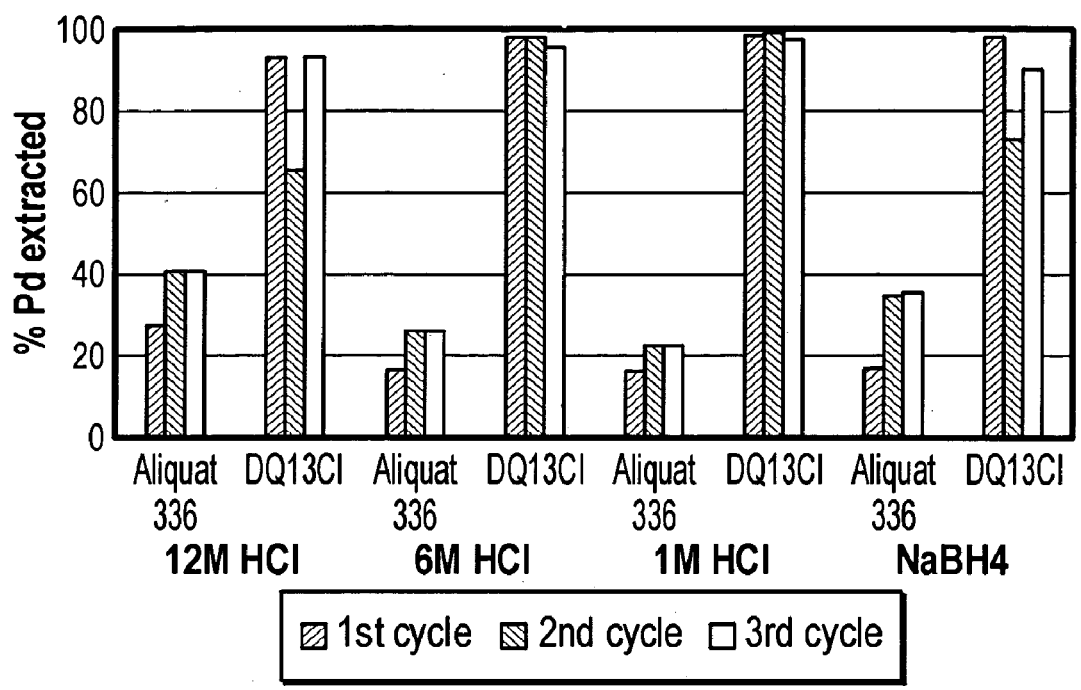
FIG. 8 is a chart comparing the efficiency of diquats in multiple extractions.

A 140 ppm palladium solution at 3M HCl and 2% extractant solutions like DQ 13C1 and Aliquat 336 in their standardized organic solvents, such as octanol or chloroform, were prepared for these experiments. 15 ml of the aqueous PGM solution was contacted with the same volume of the organic solution containing DQ 13C1 or Aliquat 336 in a 40 ml scintillation vial for 30 min by vigorous shaking. Phase separation of the mixture was then aided by centrifuging (2500 rpm; 9 min). The aqueous phases were separated using a Pasteur pipette, and then washed by contacting with 30 ml of chloroform (1 aqueous: 2 organic) for 10 min with vigorous shaking. Phase separation was again aided by centrifuge. The volume of the aqueous phase was measured, recorded and submitted for residual metal concentration. The organic phase was split to three portions and three different back-extraction methods were employed to each portion then. The aqueous phases were separated from the organic phases and the volumes were measured, recorded, and submitted to ICP analysis for PGMs concentration recovered. After back-extractions of each organic phase, the organic phase became free of PGMs. So the organic phase (i.e. DQ 13C1 solution or Aliquat 336 solution) was reused for another extraction (the next cycle). This procedure was repeated three times (three cycles). Aqueous phases from each extraction and back-extraction were analyzed for residual PGMs and recovered PGMs respectively. The results are in FIG. 8, showing that the diquats 13C1 could be reused effectively in multiple extractions of PGMs. The diquat absolutely outperformed Aliquat 336 in multiple cycles of extractions. The efficiency of the diquat was approximately constant or slightly lower during subsequent cycles (FIG. 8).

Example 9

Evaluation of the Capacity of Diquats for Extraction of PGMs

In order to make the progress of extraction cost effective it is important to reuse the extractants over and over without any loss of efficiency. This experiment was designed to determine the maximum extraction capacity of diquats in order to reuse the same materials in multiple cycles of extraction followed by a back-extraction step. This experiment exammonium saltd the number of times a diquat can be reused.

Figure 9:
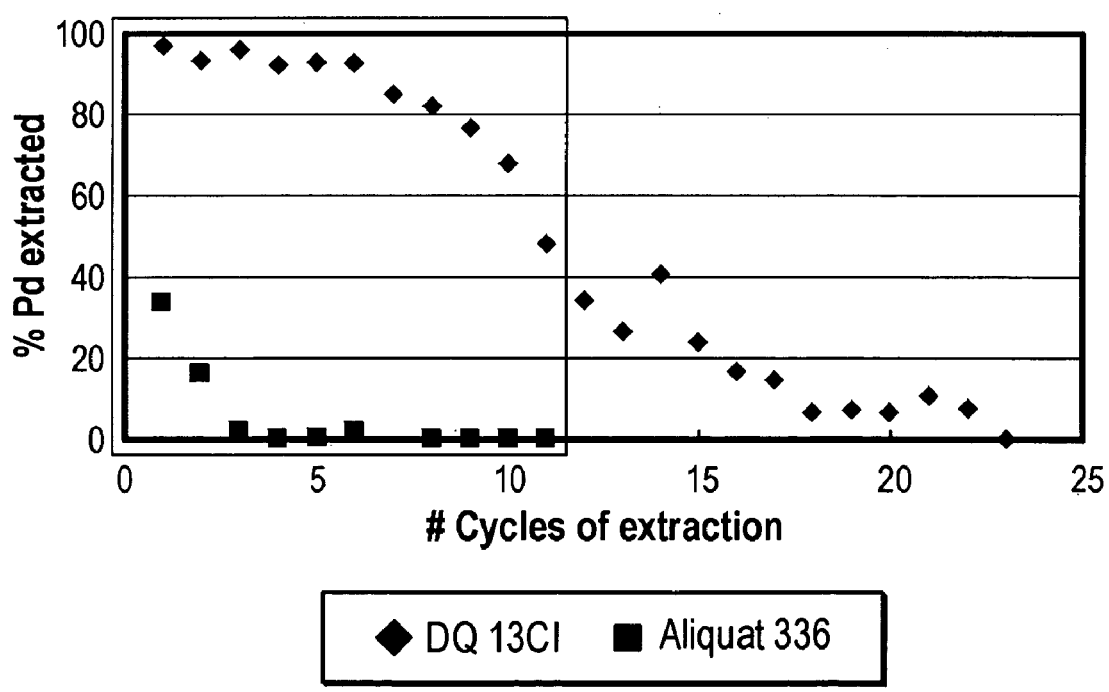
FIG. 9 is a chart showing the efficiency of DQ 13C1 in continuous Pd extractions.

In this experiment, 140 ppm Pd in 3M HCl was added into 2.5% DQ 13C1 (0.363 mmol) or Aliquat 336 (0.569 mmol) in octanol at every extraction cycle. After mixing the aqueous Pd solution and the organic extractant solution in a scintillation vial, the aqueous phase was separated from the vial for the analysis of the residual PGMs concentration. 140 ppm Pd solution was added again into the same organic phase for the next cycle. The efficiency of PGM was determined in each cycle. The result is presented in FIG. 9, showing that diquats have higher capacity to extract PGMs than Aliquat 336.

From the investigation of the reusability of diquats above we observed the cycle could be repeated more than three times. This experiment was designed to determine the extraction capacity of diquats, so that the diquat can be reused multiple cycles of extraction until no more PGM was extracted, and then the solution can be back-extracted. In FIG. 9, The Aliquat 336 already lost its extractability at $4^{th}$ cycle whereas diquat could hold its extractability over 90% at the cycle and the efficiency of diquat was over 50% till the $10^{th}$ cycle. In this experiment, 0.363 mmol DQ 13C1 extracted 0.131 mmol of palladium while 0.007 mmol of palladium was extracted by 0.569 mmol of Aliquat 336 during this experiment. Conclusively, the diquat extractant has higher capacity to extract PGMs than a commercial product, Aliquat 336.

Example 10

Effect of Changing Acid to Solvent Ratio on Back Extraction Efficiency

To conduct effective back-extraction, the optimum volume of the back extraction reagent should be determined. This was achieved by using 6M HCl in four different ratios of acid to organic phase: 1.5:1, 2:1, 3:1, and 4:1. In each experiment, 5 ml of organic phase was extracted by 6M HCl. The 3:1 ratio produced the best results.

Example 11

Recycling HCl used During Back Extraction

Figure 10:
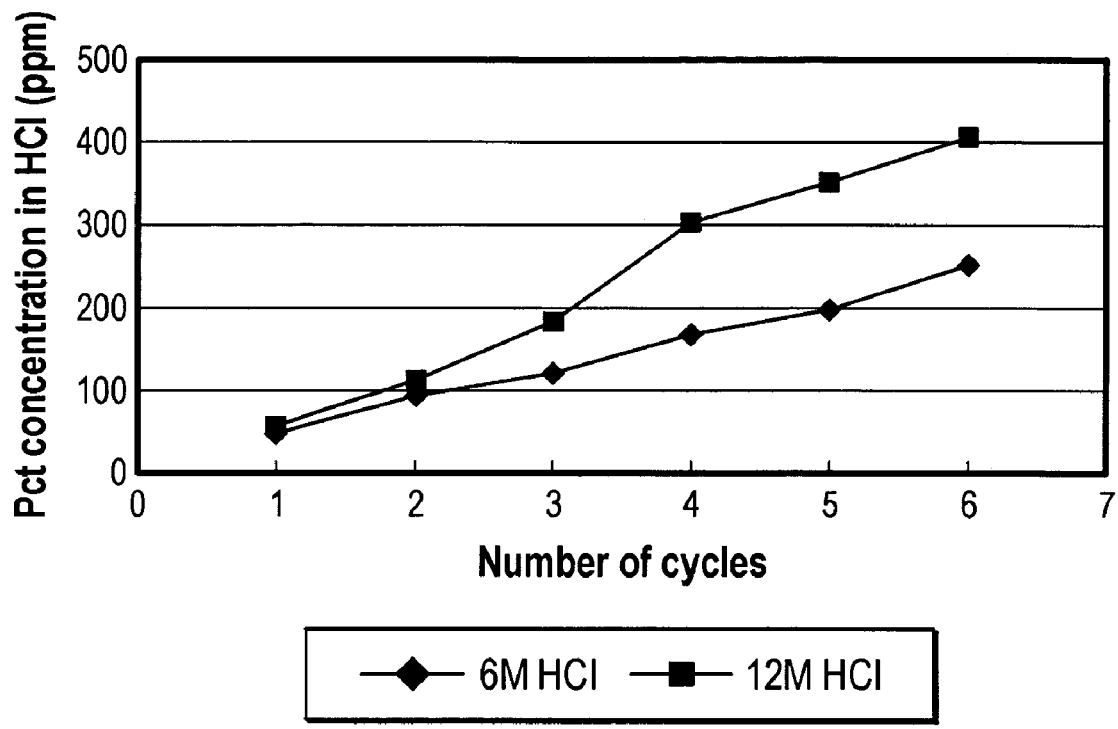
FIG. 10 is a chart showing the concentration of Pd back-extracted in HCl.

Both 6M and 12M HCl were used to evaluate their capability to back extract PGMs from a diquat/PGM-containing organic solution in multiple cycles without any loss in efficiency. 55 ml of HCl (6M or 12M) was added into the first vial of organic phase and then shaken vigorously for 10 min. The aqueous phase was separated from the vial, and then 5 ml of acid solution was taken for the Pd concentration analysis. The rest of aqueous solution was reused for the $2^{nd}$ vial. After shaking and phase separation, the aqueous phase was removed again and 5 ml of acid solution sample was taken for analysis. This procedure was repeated till after the $6^{th}$ cycle. Palladium concentrations in the aqueous acid solution are presented in FIG. 10, showing that HCl can be effectively reused as a stripping reagent for back-extractions. The concentration of Pd extracted out into the acid kept on increasing as a function of multiple cycles of back extraction.

To conduct effective back-extraction the volume of reagent of back-extraction should be determined. This was achieved by using 6M HCl in four different ratios of acid to organic phase: 1.5:1, 2:1, 3:1, and 4:1. From these studies it was observed that a volume ratio of 3:1 is the optimum for back extraction experiments.

Example 12

Feasibility of Electrochemical Recovery of PGMs

Figure 19:
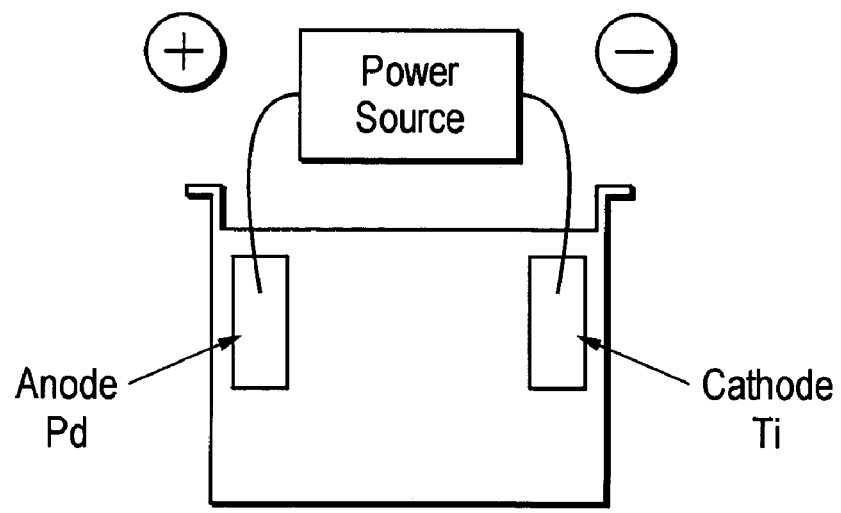
FIG. 19 is a schematic diagram of an apparatus for electro-deposition of PGMs.

The electro-deposition of PGMs is conventionally used to recover PGMs in industry. The schematic diagram is shown in FIG. 19. This experiment is designed to show the feasibility of electrochemical recovery of PGMs from the acid-stripping reagent as solid metals. The anode was a palladium foil and, the cathode was titanium gauze, and the electrolyte was $PdCl_2$ in 12M HCl as the stripping reagent. The minimum current of the power source was 10 mA. For the experiments, current was changed variously. From the difference of initial and final weight of palladium foil, it was possible to calculate how much palladium was plated on the foil out of the reagent during the experiment. The results are presented in Table 7, showing that zero-valent PGMs can be recovered by conventional electrochemical methods from the acid-stripping reagent.

During the experiments, hydrogen evolution was observed from the anode because the current was not optimized yet. Since palladinized palladium foil had a dark surface, we could confirm the electro-deposition worked. Table 7 shows the feasibility of electro-deposition as the final step of a PGM recovery process in order to obtain usable forms of PGMs.

TABLE 7

Deposition efficiency according to the current change

| | Current (mA) | | | | |
|---|---|---|---|---|---|
| | 10 | 15 | 18 | 20 | 22 |
| Efficiency (%) | 20.87 | 12.18 | 1.98 | 16.47 | 11.14 |

It is believed that optimization of this process will result in higher efficiencies and that other electrowining processes and conditions may also be used.

Example 13

Recovery of PGMs from Spent Catalytic Converters

Palladium was removed by adding KI and octanol into a dissolved catalytic converter solution (KI treatment) before the extraction with diquat. This solution was used to extract Pt from the base metals using both Aliquat 336 as well as diquats under identical conditions.

Figure 11:
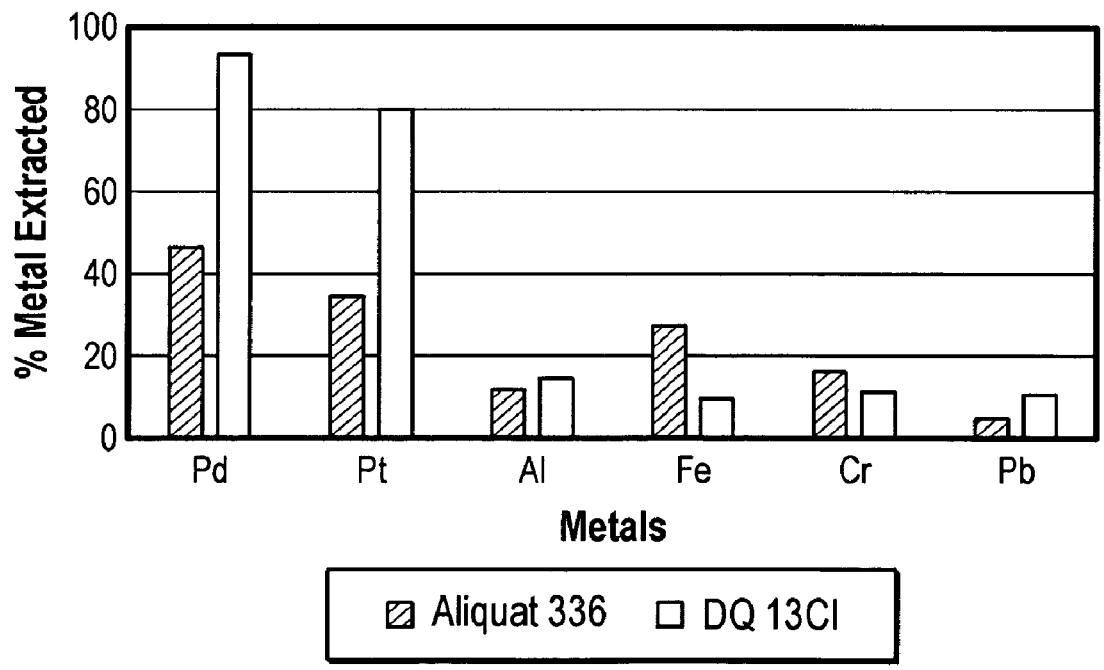
FIG. 11 is a chart showing the selectivity of diquats towards extractability of PGMs from an aqueous solution in the presence of base metals.

For this experiment, a piece of the monolith of a catalytic converter was crunched into small pieces, digested in hydrochloric acid with heat and diluted in 3M HCl be adding deionized water to the digested solution. Using the catalytic converter solution KI treatment was conducted to remove palladium first because KI selectively extracted palladium over other PGMs and base metals. 0.012 g KI was added into 60 ml of the catalytic converter solution and then 60 ml octanol was added as well into the vial and the mixture was shaken for 30 minutes. After phase separation, 10 ml of the aqueous phase was submitted for residual metals analysis. The rest of solution was used for DQ 13C1 extraction and Aliquat 336 extraction. The aqueous phases from each extraction were submitted for analysis of the residual PGMs by ICP. The organic phase of KI treatment was reused for a second KI treatment to remove the rest of palladium in organic solution. The result is presented in FIG. 11, showing that the Diquats outperformed Aliquat 336 in extraction of PGMs from the catalytic converter solution.

Both Aliquat 336 and DQ 13C1 were used to compare the efficiencies of two extractants. As seen in FIG. 11, diquat had higher selectivity over base metals and high efficiency to extract PGMs from the catalytic converter solution while Aliquat 336 picked up more Fe and Cr and low recovery rates of PGMs from the solution. Conclusively diquats outperformed Aliquat 336 in extraction using Honda catalytic converter solution.

Example 14

Synthesis and Characterization of Additional Diquats

Figure 12:
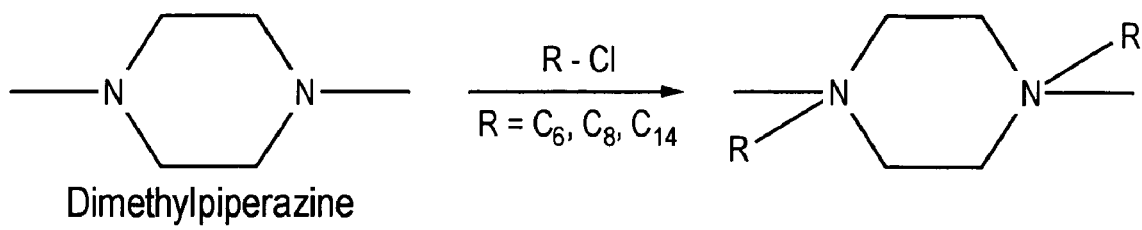
FIG. 12 is a chart illustrating a synthetic scheme for synthesis of new diquaternary ammonium salt compounds.

Three new diquats were synthesized that varied only in the length of the side chain substitution on the two quaternary nitrogens as shown in FIG. 12. The synthesis of the additional diquats was similar to the procedure for diquats synthesis described previously.

In a typical synthesis reaction, 10 mM of a diammonium salt (1,4-Dimethylpiperazine (DMP)) was added to 25 mL of dimethyl formamide in a 200 mL round bottomed flask. To this solution was added a 4× molar excess of an alkyl chloride (1-Chlorohexane (CH), 1-Chlorooctane (CO), 1-Chlorotetradecane (CTD)). This was followed by the addition of 0.2 g of sodium carbonate and a stir bar. The flask was then placed in a magnetically stirred/heated oil bath at ~110° C. and capped with a 20° C. water-cooled reflux condenser. The reflux condenser was sealed with a rubber septum and vented with a syringe needle. The reaction mixture was then sparged with argon, heated and stirred for 48 hours.

The synthesized diquaternary ammonium salts were precipitated using 100 mL of a 1:1 mixture of hexanes: benzene. The solutions were then placed at −15° C. overnight. Precipitates were isolated by vacuum filtration on Fisher Brand Medium-Fine filter paper, washed with an additional 20 mL of solvent mixture and vacuum dried overnight at room temperature. The diquat products were weighed, sealed in glass vials and labeled, and stored at 5° C. until further use. The yields of the new diquats synthesis were 45%, 1%, 20% for $C_6$, $C_8$, $C_{14}$ respectively. The synthesis and work up conditions of these syntheses have not yet been optimized which accounts for the low yields.

Slight variations in heating conditions were used during the synthesis of the additional compounds. The temperature was kept at 110° C. for the $C_{14}$ diquat and 90° C. for the shorter chain diquats, $C_6$ and $C_8$. The $C_6$ and $C_{14}$ diquats were stable compounds at room temperature. The $C_8$ diquat was initially unstable at room temperature so workup and storage conditions were modified to keep this diquat in solid form.

Example 15

Testing of the Additional Diquats for PGM Extraction Selectivity

Figure 13:
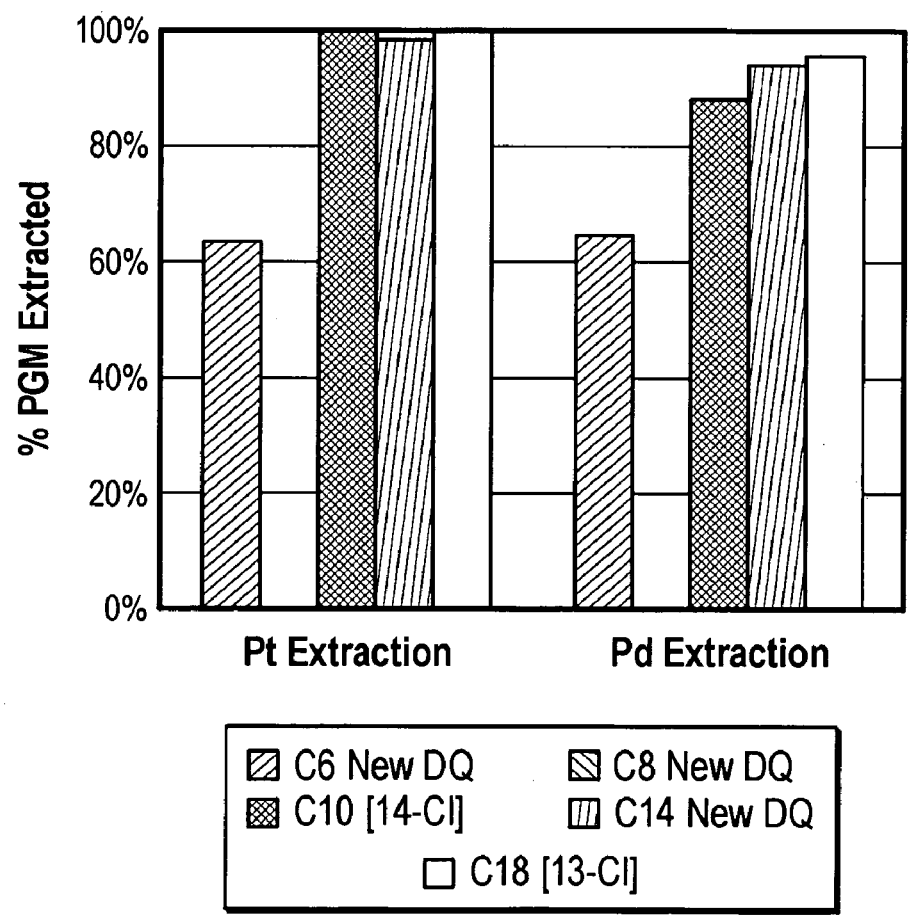
FIG. 13 is a chart showing that longer side chain substitution increases PGM extraction efficiency.

Preliminary extraction tests were carried out with the three additional diquats synthesized in Example 14 to compare their extraction efficiencies to those of the previously synthesized diquats. For these extractions, 5 mL of a 2.5% diquat solution was contacted with 5 mL of 50 ppm PGM (platinum or palladium) solution in 3M HCl for 30 minutes with vigorous shaking. Phase separation was aided by centrifuging the samples at 2500 rpm for 3 minutes. The aqueous phase was then removed by pasteur pipet and washed with 12–15 mL of fresh chloroform (1 aqueous:2 organic) for 1 minute with vigorous shaking. Phase separation was again aided by centrifugation and the washed aqueous phase was removed. The volume of the washed aqueous phase was measured as well as the weight of the total aqueous phase and then analyzed by in house Inductively Coupled Plasma Atomic Emission Spectrometry for PGM concentration. The extraction results for the additional diquats of Example 14 as well as DQ's 13-C1 and 14-C1 can be found in FIG. 13. The diquats, $C_6$ ($C_6H_{13}$+DMP), $C_8$ ($C_8H_{17}$+DMP) $C_{10}$ (DQ 14-C1 is $C_{10}H_{21}$+DMP), $C_{14}$ ($C_{14}H_{29}$+DMP), and $C_{18}$ (DQ 13-C1 is $C_{18}H_{37}$+DMP) comprise diquat compounds of side chain length ranging from $C_6H_{13}$ to $C_{18}H_{29}$. The concentration of the metal extracted by the diquat was assumed to be the difference between the concentration of metal in the aqueous phase before and after the extraction.

Example 16

Investigation of the Material Balance of PGM Extraction

Experiments were carried out to try and determine the material balance of PGM's at every step of the extraction and recovery process. To determine the material balance of the extraction process, five continuous extractions of platinum ions from an aqueous solution were carried out with organic solutions containing 1.0% and 1.5% DQ 13-C1 and Aliquat 336, where both aqueous and organic phases were tested for PGM concentration. Only the aqueous phases were analyzed in all previous experiments and PGM concentration was determined from the amount of PGM's in the aqueous phase before and after the extraction. The experimental procedure is detailed below.

Figure 14:
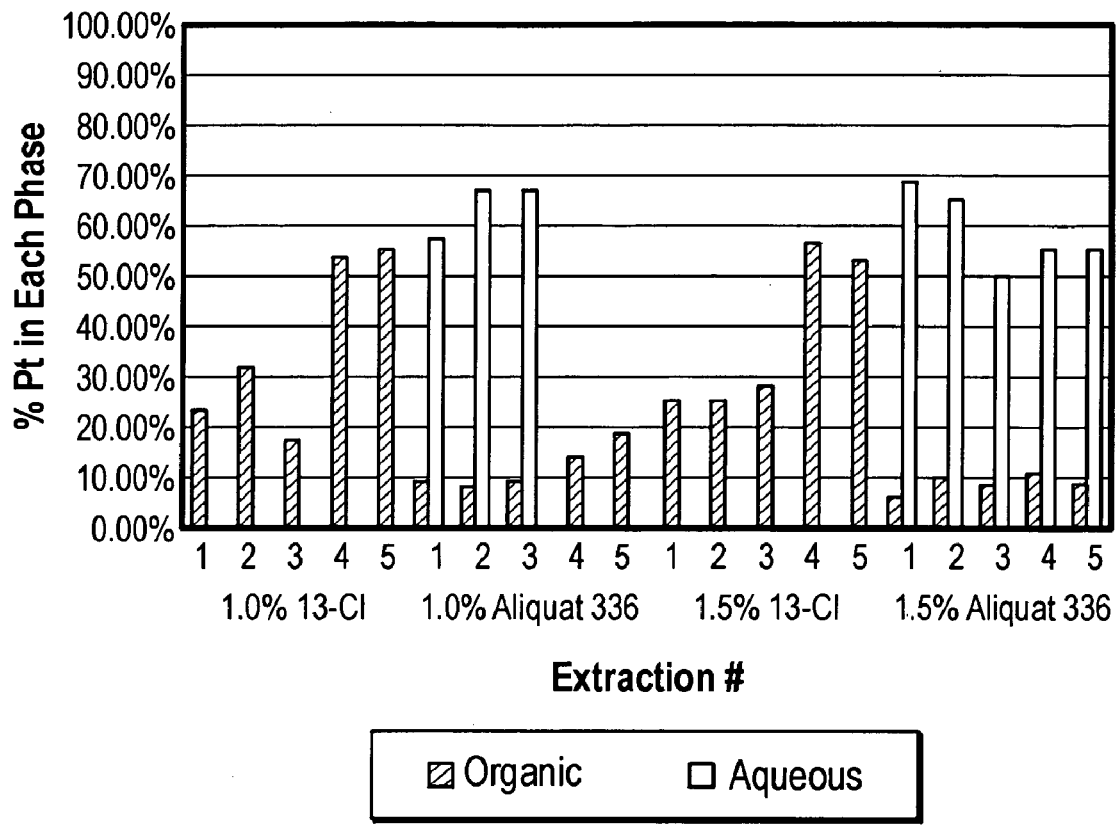
FIG. 14 is a chart showing the percentage of Pt in each phase.

15 mL of organic solutions containing DQ 13-C1 and Aliquat 336, respectively, were contacted with 10 mL of the 140 ppm platinum solutions for 30 minutes with vigorous shaking. Phase separation was aided by centrifuging the mixtures for 6 minutes at 2700 rpm. The aqueous phases were separated using a pasteur pipet then washed with 25 mL of fresh chloroform (1 aqueous:2 organic) by shaking it vigorously for 10 minutes. Phase separation was again aided by centrifugation and the washed aqueous phase was removed. The volume of the washed aqueous phase was measured and a 5 mL sample was removed and submitted for in house ICP analysis for residual platinum concentration. A 1 mL sample was also taken from each organic phase for ICP analysis of platinum concentration. 15 mL of 140 ppm platinum solution was then added to this same organic phase for the next extraction. The percentage platinum found in both phases after each extraction was calculated and can be found in FIG. 14.

Example 17

Determination of the Binding Capacity of Different Diquats

Another material balance related experiment was conducted that aimed at calculating the binding capacity of different diquats. A two-cycle experiment was performed where a single cycle involves an extraction step followed by a back extraction or stripping step with 12M HCl. The details of both steps are given below.

Extraction Procedure

Diquat solutions were made with 0.5 wt % of 13-C1, 14-C1, 17-C1 and 18-C1 in their standardized organic solvents. 15 mL of these diquat solutions were contacted with 15 mL of 140 ppm platinum solution in 3M HCl for 30 minutes with vigorous shaking. Phase separation was aided by centrifuging the mixtures for 6 minutes at 2700 rpm. The aqueous phases were separated using a pasteur pipet then washed with 30 mL of fresh chloroform (1 aqueous: 2 organic) by shaking it vigorously for 10 minutes. Phase separation was again aided by centifugation and the washed aqueous phase was removed. The volume of the washed aqueous phase was measured and a 5 mL sample was removed and submitted for in house ICP analysis for residual platinum concentration.

12M HCl Back Extraction Procedure

The organic phase from the extraction step was split in half to carry out two different back extraction methods, 12M HCl and $NaBH_4$ precipitation. The $NaBH_4$ back extraction method is still under investigation. This organic phase, now containing diquat/platinum anion complexes, was back extracted with 12M HCl (1 organic:2 aqueous). The organic phase was contacted with aqueous 12M HCl for 10 minutes with vigorous shaking. Phase separation was aided by centrifugation for 3 minutes at 2700 rpm. The volume of the washed aqueous phase was measured and a 5 mL sample was removed and submitted for in house ICP analysis for platinum concentration recovered. This is the end of the $1^{st}$ cycle.

Figure 16:
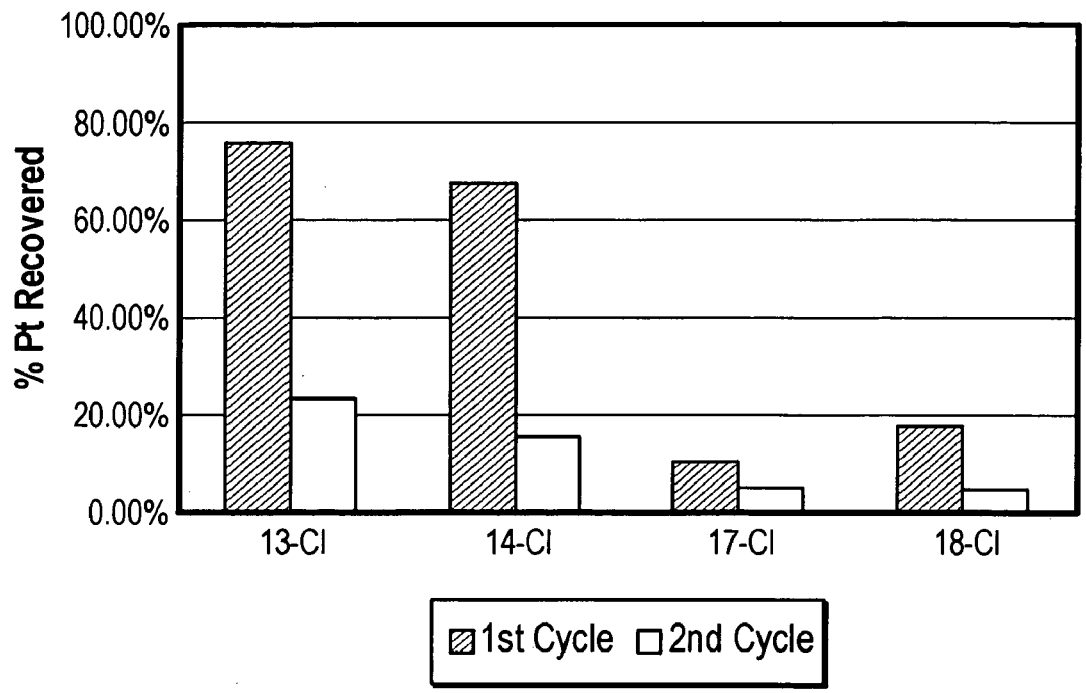
FIG. 16 is a chart showing that the diquats 13-C1 and 14-C1 outperform the diquats 17-C1 and 18-C1 and continue to extract a majority of PGMs at low concentrations.

After the back extraction step, the organic phase was theoretically free of platinum and was used for the $2^{nd}$ cycle beginning with the extraction step again with another 140 ppm platinum solution. The extraction efficiency of both of these cycles was calculated and is displayed in FIG. 16.

Figure 15:
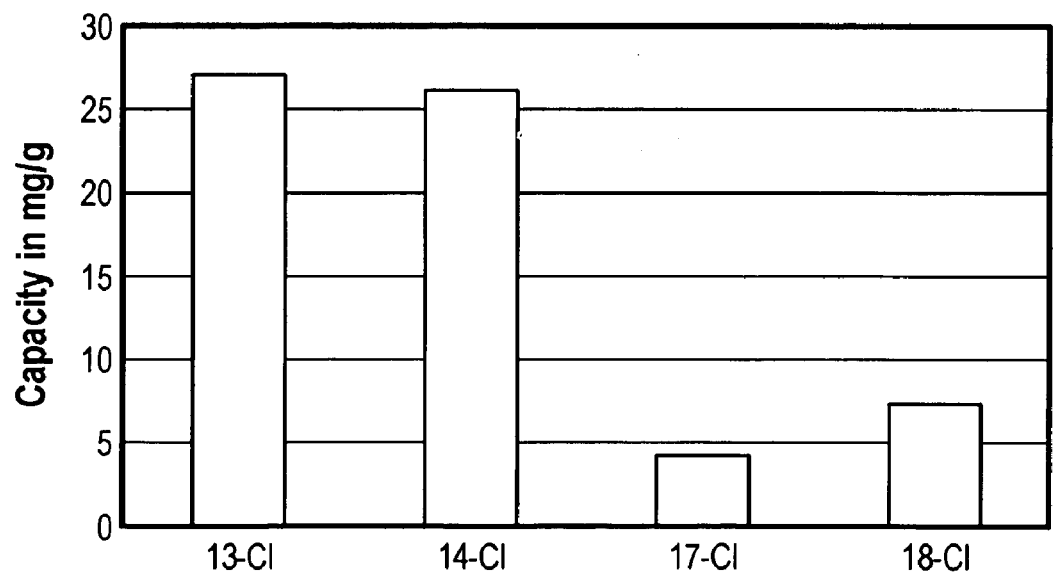
FIG. 15 is a chart showing the binding capacities of different diquats.

Low concentration 0.5 wt. % diquat solutions were used in order to saturate the diquats with PGMs. Binding capacities were calculated based upon the concentration of PGM's in the saturated diquat after the first extraction. These values are given in numerical form in Table 8. and in graphical form in FIG. 15. As expected, the second cycle had a much lower extraction efficiency than the first due to the high level of saturation achieved in the first extraction.

TABLE 8

Binding capacities of different diquats

|  | moles of DQ used | moles of Pt extracted | Ratio | grams of DQ used | mg's of Pt extracted | Capacity in mg/g |
|---|---|---|---|---|---|---|
| 13-C1 | 1.082E−04 | 1.040E−05 | 0.096 | 0.075 | 2.029 | 27.05333 |
| 14-C1 | 1.610E−04 | 1.006E−05 | 0.062 | 0.0753 | 1.963 | 26.06906 |
| 17-C1 | 1.062E−04 | 1.635E−06 | 0.015 | 0.0752 | 0.319 | 4.242021 |
| 18-C1 | 1.561E−04 | 2.835E−06 | 0.018 | 0.0755 | 0.553 | 7.324503 |

Example 18

Determination of the Extraction Capacity of Diquats

Figure 17:
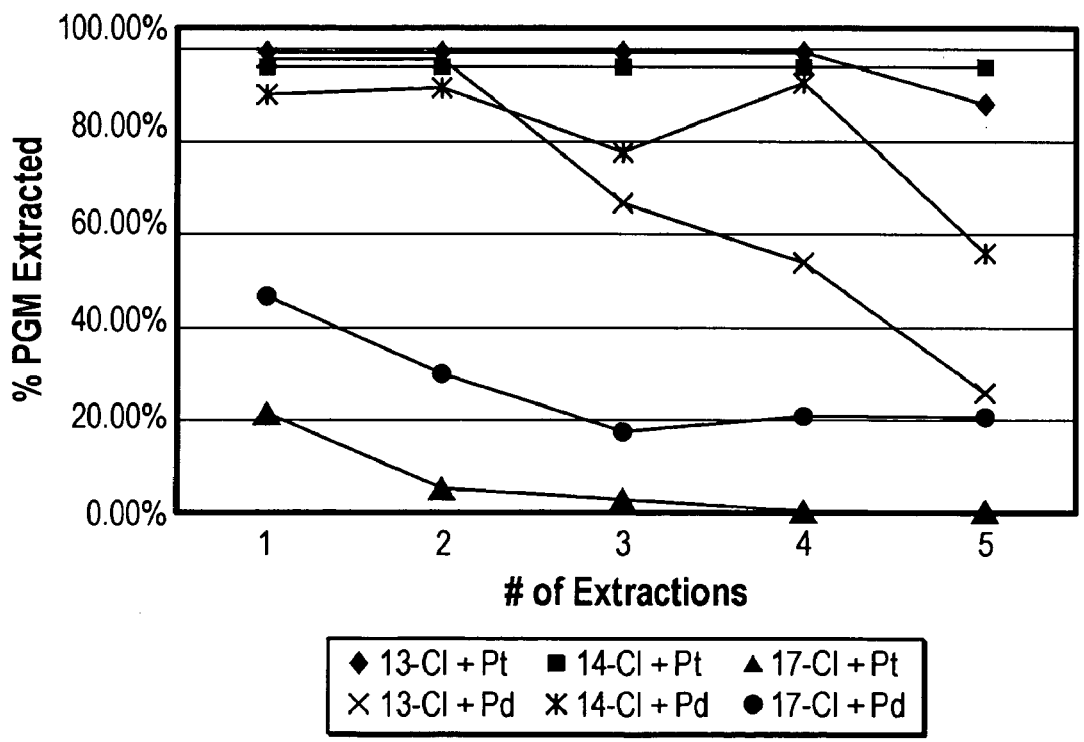
FIG. 17 is a chart showing that the diquats 13-C1 and 14-C1 continue to extract over 90% of PGM's in multiple solvent/solvent extractions.

The continuous reusability of the diquat solutions before a back extraction is needed can make the PGM extraction process more cost effective. An experiment involving 10 continuous extractions with 1.0% 13-C1, 14-C1, and 17-C1 organic diquat solutions and 140 ppm platinum and palladium aqueous solutions was carried out to examine the extent of continuous reusability of these diquats. In this experiment, 20 mL of each diquat solution was contacted with 20 mL of the aqueous PGM solutions for 30 minutes with vigorous shaking. Phase separation was aided by centrifuging the mixtures for 6 minutes at 2700 rpm. The aqueous phases were separated using a pasteur pipet then washed with 40 mL of fresh chloroform (1 aqueous:2 organic) by shaking it vigorously for 10 minutes. Phase separation was again aided by centrifugation and the washed aqueous phase was removed. The volume of the washed aqueous phase was measured and a 5 mL sample was removed and submitted for in house ICP analysis for residual Platinum or Palladium concentration. The chloroform washes contained residual organic (diquats-PGMs) and therefore were evaporated down to ~1 mL of volume in an Erlenmeyer flask and then added to the organic phase before continuing with the next extraction. A 140 ppm PGM solution was then added to this same organic phase for the next extraction. The efficiency of these first 5 extractions was determined and is presented in FIG. 17, showing that Diquats can be continuously reused with little loss in efficiency. As can be seen in FIG. 17. 13-C1 and 14-C1 continue to extract over 90% of the platinum after 5 continuous extractions.

Example 19

Investigation of Reusability of the Stripping Agent with Platinum

Figure 18:
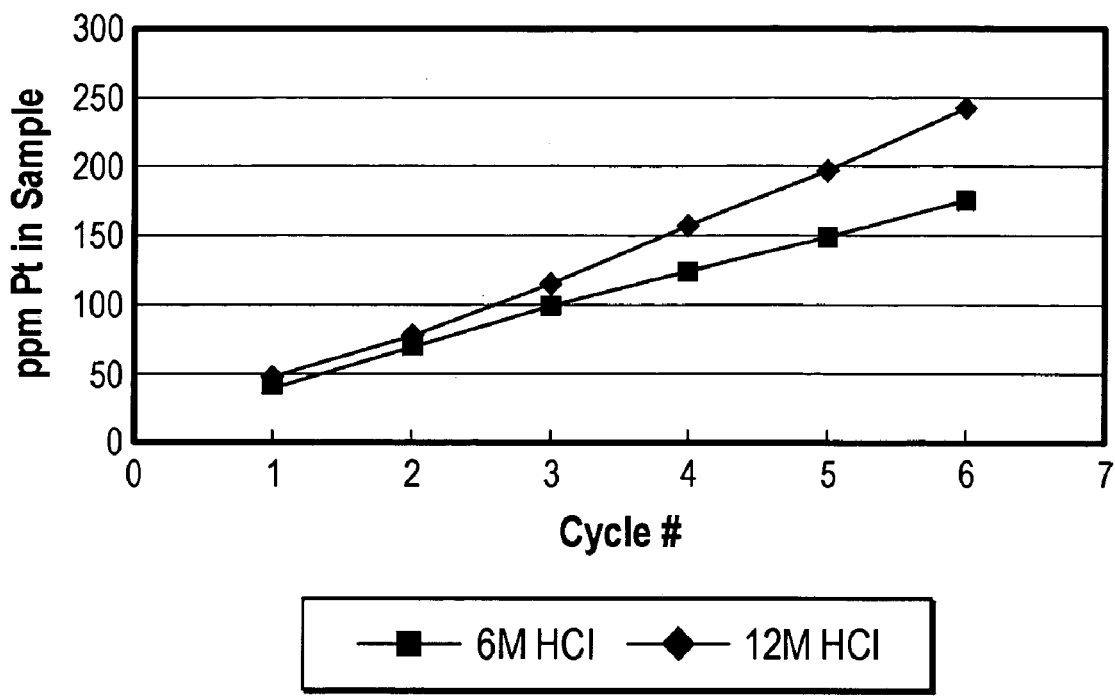
FIG. 18 is a chart showing that HCl can be reused effectively for multiple back extractions.

Reusability of the stripping agent used for back extracting PGMs from bound diquats can also improve the cost efficiency of the extraction process. An experiment was conducted to determine if HCl could be reused as a stripping agent for platinum. A similar experiment was conducted to determine the extent of the reusability of HCl as a stripping agent for palladium. 55 mL of 12M or 6M HCl was contacted with a 5 mL aliquot of a saturated organic phase. This organic phase was prepared by extracting 40 mL of 2000 ppm platinum solution with 40 mL of 0.5% DQ 13-C1. The mixture was shaken vigorously for 10 minutes, then centrifuged to aid separation of the phases. The aqueous phase was removed, its volume measured and a 5 mL sample removed for ICP analysis for platinum concentration. The remaining aqueous phase was then contacted in a similar manner with another 5 mL aliquot of the same organic phase mentioned above. This process was repeated 6 times. Aqueous samples were analyzed for platinum concentration after each contact with the saturated organic phase aliquots and the results can be found in FIG. 18. FIG. 18 shows that HCl can be continuously reused for stripping PGMs from saturated diquats. Similar results have been obtained when back extracting palladium. While 12M HCl back extracted more total platinum than 6M HCl, a significant amount of platinum was still recovered by 6M HCl, so 6M HCl could still be used and possibly reduce the cost of the back extraction procedure versus using 12M HCl.

It is apparent that selectively extracting palladium first by using an iodide is beneficial because it allows the diquaternary ammonium salts to be used for extracting only the other preferred metals. Extracting capacity by the diquaternary ammonium salts is not reduced by having to extract palladium. Furthermore, it becomes apparent that selected diquaternary ammonium salts may be used in separate extracting processes after the palladium has been extracted, each additional extracting process selectively extracting one or more valuable metals from the aqueous solution. For example, after the palladium has been extracted using an iodide, platinum may be extracted using one diquaternary ammonium salt selective for platinum, and then after separation, rhodium may be extracted using a different diquaternary ammonium salt selective for rhodium.

Figure 20:
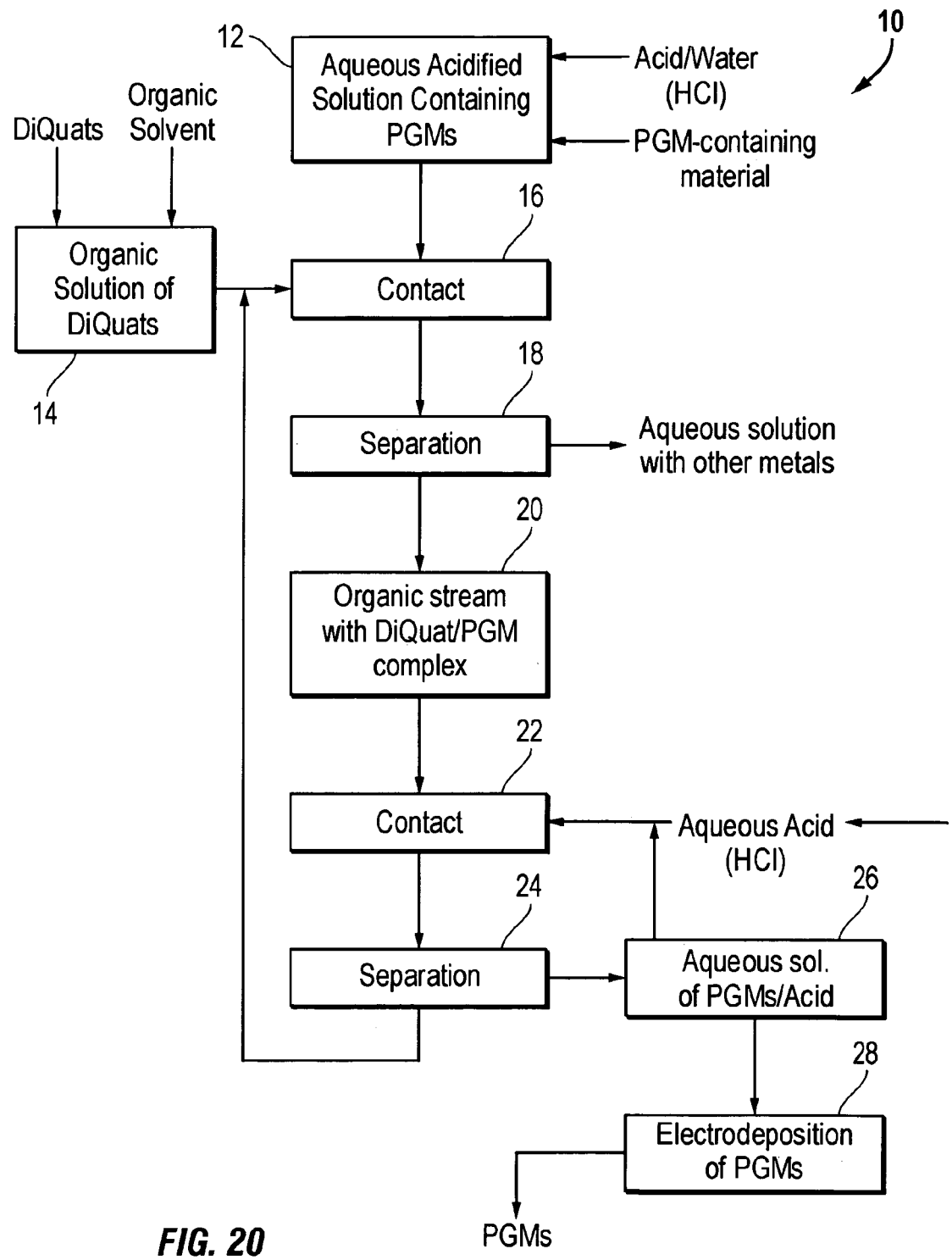
FIG. 20 is a process flow diagram illustrating a solvent/solvent process for recovering a PGM.

FIG. 20 is a process flow diagram illustrating a preferred process for recovering a PGM. The preferred process generally includes extraction, back-extraction and electrodeposition. Other less preferred processes may include extraction without subsequent processing or with alternative processing. However, in the process 10 of FIG. 20, a PGM-containing material (preferably commuted) is combined with an aqueous acid, such as hydrochloric acid, to form an aqueous acidified solution containing one or more PGMs in step 12. A quantity of atleast one diquat is combined with an organic solvent to form an organic solution of the atleast one diquat in step 14. In step 16, the aqueous PGM solution from step 12 is intimately contacted with the organic diquat solution from step 14. During the contact, the diquats extract one or more of the PGMs, depending upon the diquat selected and the one or more PGM being targeted for extraction, to form one or more diquat/PGM complex. After forming the complex(es) in step 16, the two phases are separated in step 18, to form an aqueous solution containing the non-extracted metals and an organic solution 20 containing the diquat/PGM complex(es).

In step 22, the organic solution 20 is intimately contacted with an aqueous acid, such as hydrochloric acid, in order to back-extract the one or more PGMs from the diquat/PGM complex(es) of the organic solution 20 into the aqueous solution. The aqueous and organic phases are separated in step 24 to form an aqueous solution 26 contained acid and the one or more PGMs. The separation step 24 also yields an organic solution containing the diquats that may be reused for various number of extraction cycles in step 16. The aqueous solution 26 containing acid and the one or more PGMs may be recyled through the contact step 22 for further back-extraction of the one or more PGMs for a selected number of cycles while building up the concentration of the PGMs. After the selected number of cycles or obtaining a PGM concentration, the solution 26 is subjected to separation of the PGM out of the solution in step 28, such as by electrodeposition of the PGMs onto an electrode.

The PGM-coated electrodes may then be used as stock for use in a variety of applications requiring the PGMs. Once the PGMs are taken out, the aqueous solution may also be recycled for further use in step 22.

It should be recognized that the process 10 of FIG. 20 may be performed in various modes, including batch, semi-batch, continuous, or semi-continuous processes. The process may also be performed at various scales, such as laboratory or industrial quantities. Furthermore, the individual steps may be accomplished with various unit processes. For example, the separation steps may be accomplished with gravity or centrifuging, and the contacting may include stirring or static mixing. Such exact process considerations or selections are understood to be with the skill of a process designer.

Discussion and Examples Specific to Solid/Liquid Extraction

One embodiment of the invention provides for the use of diquaternary ammonium salt solids as an extractant to selectively extract either a target metal, such as a contaminant or a desirable PGM species, from concentrations of inert or undesirable species that can be many orders of magnitude more abundant. Solid diquaternary ammonium salts may, for example, be prepared in accordance with Examples 1 and 14, above. The spacing of the quaternary nitrogens of a diquaternary ammonium salt is designed or selected in the same manner as previously described in to accommodate binding of a target metal anion complex. The selected diquats have been substituted heavily with hydrophobic alkyl chains that make these diquats insoluble in acidic solutions.

The primary advantage of using solid diquaternary ammonium salts as extractants is that the diquats can be used directly with the aqueous PGM solution, rather than first requiring that the diquats be dissolved in an organic solvent. Because the diquats are used directly as solids, the extraction capacity of the diquats is no longer limited by their solubility in the organic solution. Furthermore, the diquat/PGM complexes formed during the extraction process are easily precipitated out of solution, thereby simplifying the separation. Further still, recovery of metal becomes more convenient.

In order to verify the suitability of solid diquats for direct use as PGM extractants, ten diquaternary ammonium salts were synthesized in accordance with the synthetic scheme shown here:

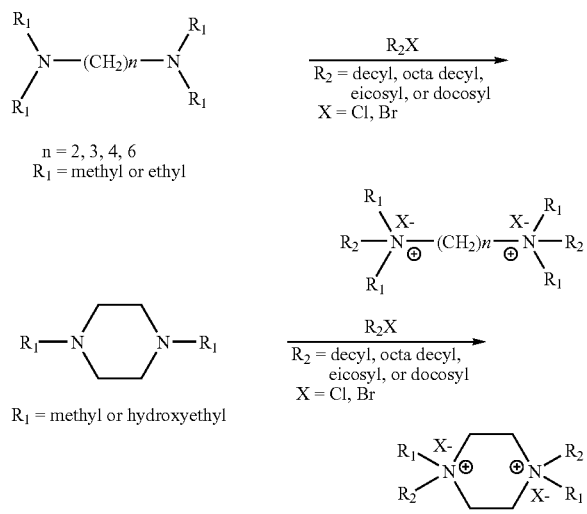

Figure 21:
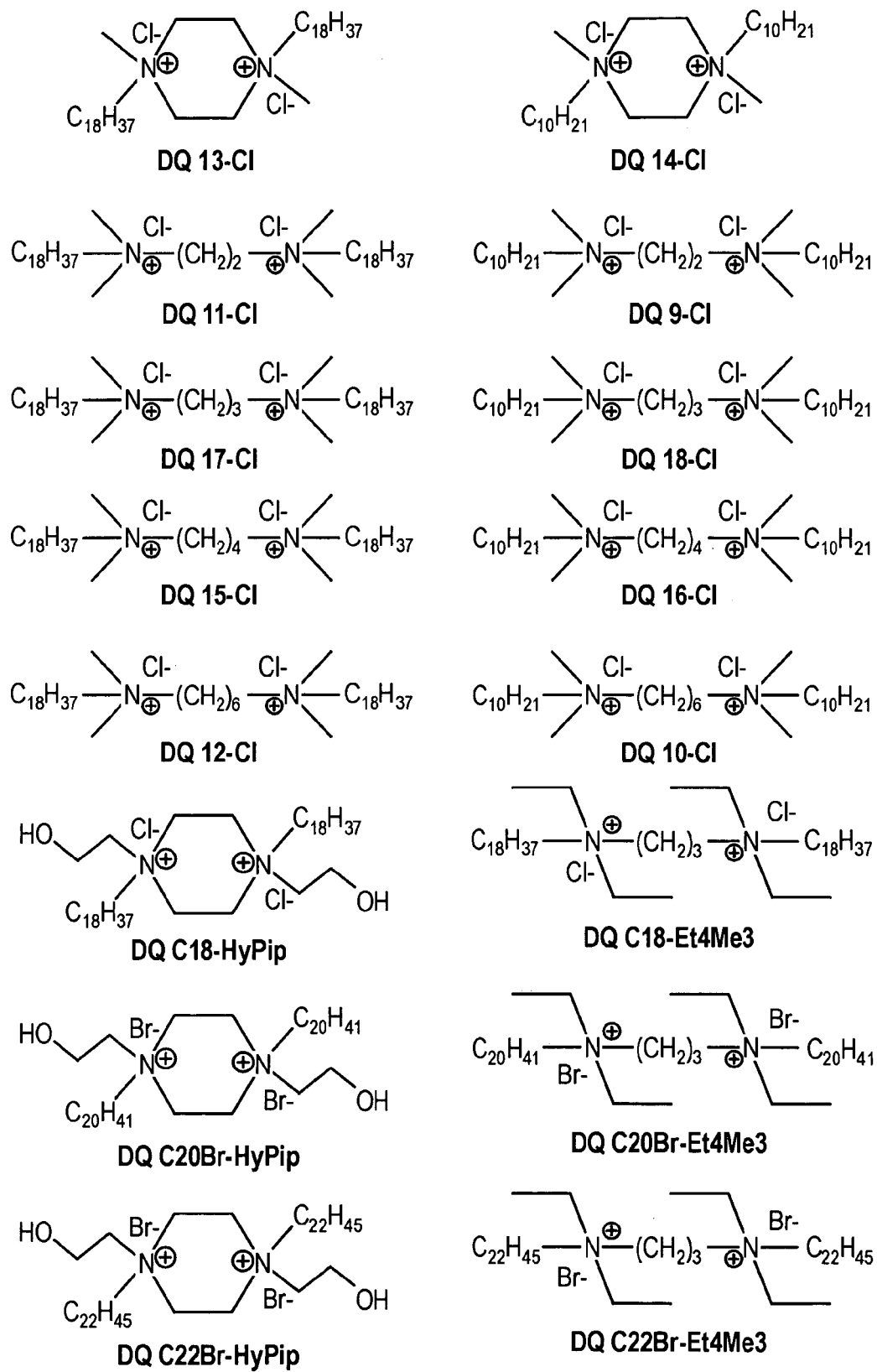
FIG. 21 shows the structure of select diquaternary ammonium salts along with their identification label.

A list of the compounds synthesized in this manner and their identification label is presented in the following Table and shown in FIG. 21. It should be noted that many of these compounds were previously referred to in FIG. 1.

| DQ ID | DQ full name |
| --- | --- |
| DQ 13-Cl | Bis-octadecyl, methyl piperazine Ammonium Chloride |
| DQ 14-Cl | Bis-decyl, methyl-piperazine Ammonium Chloride |
| DQ 11-Cl | Dimethyl, octadecyl ethylene Diammonium Chloride |
| DQ 9-Cl | Dimethyl, decyl ethylene Diammonium Chloride |
| DQ 17-Cl | Dimethyl, octadecyl propyl Diammonium Chloride |
| DQ 18-Cl | Dimethyl, decyl propyl Diammonium Chloride |
| DQ 15-Cl | Dimethyl, octadecyl butyl Diammonium Chloride |
| DQ 16-Cl | Dimethyl, decyl butyl Diammonium Chloride |
| DQ 12-Cl | Dimethyl, octadecyl hexyl Diammonium Chloride |
| DQ 10-Cl | Dimethyl, decyl hexyl Diammonium Chloride |
| DQ C18-HyPip | Bis-hydroxyethyl, octadecyl piperazine Ammonium Chloride |
| DQ C18-Et4Me3 | Diethyl, octadecyl propyl Diammonium Chloride |
| DQ C20Br-HyPip | Bis-hydroxyethyl, eicosyl piperazine Ammonium Bromide |
| DQ C20Br-Et4Me3 | Diethyl, eicosyl propyl Diammonium Bromide |
| DQ C22Br-HyPip | Bis-hydroxyethyl, docosyl piperazine Ammonium Bromide |
| DQ C22Br-EtMe3 | Diethyl, docosyl piperazine Diammonium Bromide |

Usage of diquaternary ammonium salts in solid form includes a process whereby the solid diquat is contacted with an aqueous solution of PGMs and base metals under suitable conditions allowing at least one of the PGMs to be selectively bound to the diquaternary materials leaving base metals in the aqueous solutions. This is followed by separation of the aqueous stream containing mainly base metals. It is preferred to then wash the solid materials to remove any physically trapped metal ions. It is also preferred to recover at least one PGM from the solid matrix by at least one or a variety of methods.

The extraction process may be carried out wherein the solid is primarily diquaternary ammonium salt in powder, pellet, membrane, coating, resin or bead formats. Alternatively, the solid can also be a composite of diquaternary ammonium salt and a support material in order to maximize the surface area of the diquaternary ammonium salt material or immobilize the diquat. The support material can be polymeric or monomeric, organic or inorganic, or bioorganic. The composite can be prepared by adding the diquat to the support material before, during or after polymerization. This can be achieved through chemical or physical adsorption, physical absorption or simple mixing and milling. The composite can be shaped in different formats, or packed in different forms. It can be in the form of foam, pellets, a coating, a fiber, or a powder membrane. For example, the diquat may be in the form of a simple diquat polymer or a polystyrene membrane coated with diquats.

The extraction process involves bringing the solid Diquat containing material, either only diquaternary ammonium salt or a composite of this material and some other support material, into contact with metal ion solutions, specifically PGM solutions. This contact can be achieved by either adding the solid material into the solution, adding the solution to the solid material, or packing the solid material into a column so that the solution can be passed through the column. Any mixing format that allows' for contact between the PGM solution and the diquats-containing solid can be used. Examples of possible mixing formats are, but not limited to, column, batch or vessel systems.

Once the Diquat containing solid and the solution are in contact with one another, it is preferable to provide agitation by any method for an appropriate period of time. Examples of possible agitation methods include, but not limited to, shaking, vibrating, pulsing, centrifuging, cycloning, and the like.

After the solution and solid diquats have been contacted and optionally agitated, the solids can be removed or separated from the solution immediately. Separation can be achieved by any known method, including, but not limited to, draining using gravity, vacuum suction, centrifugal force, centrifuging, cycloning or use of air pressure. The separation step can also be followed by a washing step to remove unbound materials from the solid matrix.

Once separated, it is preferred to recover pure metals (PGMs) from the solid material, such as by burning or incinerating the solid material at an appropriate temperature. This recovery process can be done with or without oxygen present, preferably in the presence of oxygen. Alternatively, PGMs can be recovered by back extraction with an appropriate back extractant such as a strong acid or base or any other chelating agent that has affinity for PGMs. Pure PGMs can then be recovered from the back extractant using electrochemical or chemical precipitation methods.

The use of solid diquats in this manner provides a process that overcomes the problems encountered with a solvent extraction process, namely low solubility of the diquats in organic solvents (2–5% maximum weight %) and the low solubility of the organo-metallic (diquat/PGM) complex in both aqueous and organic solutions.

Example 20

Feasibility of Using Solid Diquaternary Ammonium Salts for Solid-Liquid Extraction of PGMs In order to determine if the diquaternary ammonium salt solid could be used to extract PGMs a simple experiment was performed where 100 mg of two different diquats (0.145 mmol DQ 11-C1 and 0.132 mmol DQ C18-HyPip) was contacted with 10 mL of a 1575 ppm Platinum solution in 3M HCl (0.0807 mmol Pt) for two hours with shaking. After shaking, the aqueous solutions were filtered using disposable syringe filters and the filtered aqueous solution was analyzed by in-house ICP for platinum concentration. DQ 11-C1 extracted 84% (0.0677 mmol Pt) of the available platinum and DQ C18-HyPip extracted 57% (0.0462 mmol Pt) in two hours of contact time.

Example 21

Precipitation and Identification of Organo-Metallic Complex

An experiment was conducted using dissolved diquats in the solvent extraction process which produced a solid precipitate that was determined to be the diquat-PGM organo-metallic complex. In this experiment, 2.0% solutions of DQ's 11-C1 and C18-HyPip (1.44 mmol and 1.33 mmol, respectively) in 50 mL of chloroform was contacted with 50 mL of a 1500 ppm Platinum solution in 3M HCl (0.402 mmol Pt) for several minutes with shaking. After shaking, 10 mL of chloroform was added if the aqueous and organic phases were inseparable. The organic phase was then removed and replenished with 50 mL of fresh 1500 ppm Platinum solution and shaken in a separatory funnel for a few minutes. DQ's 11-C1 and C18-HyPip went through two and three continuous extractions, respectively, as described by the above procedure. After the last continuous solvent extraction, the solid precipitate that had formed was collected, washed thoroughly and dried. Aliquots of this solid precipitate from both diquats were analyzed for C, H, N Analysis by Robertson Microlit Laboratories in Madison, N.J. A second aliquot of the C18-HyPip solid precipitate was digested and analyzed in-house on ICP for platinum concentration without further purification.

The platinum concentration in the solid precipitate was determined to be 187,756 ppm. The % Diquat and Platinum in the solid precipitate is presented in Table 1. The theoretical ratio was also calculated and shows that there is very little error in the analytical result obtained.

TABLE 1

Platinum Analysis of Solid Precipitate (DQ C18-HyPip)

|  | 1.1 Theoretical Ratio | 1.2 Analytical Result |
|---|---|---|
| % Diquat | 82.09 | 80.22 |
| % Platinum | 17.91 | 18.78 |
| Total | 100 | 99 |

The C,H,N analysis results as well as calculated theoretical values for an organo-metallic complex of the formula, $DQ\text{-}PtCl_6^{2-}$ (where DQ stands for the specific formula of each individual diquat) are presented in Table 2 for the both diquats.

TABLE 2

Elemental Analysis of Solid Precipitate

|  | % C | % H | % N | % Sum |  |
|---|---|---|---|---|---|
| C18HyPip-Pt | 48.53 | 8.46 | 2.57 | 59.56 | Theoretical |
|  | 48.15 | 8.96 | 2.79 | 59.90 | Analytical |
| DQ 11Cl-Pt | 48.93 | 8.74 | 2.72 | 60.39 | Theoretical |
|  | 51.86 | 10.44 | 2.39 | 64.69 | Analytical |

From these two analyses, it is clear that the diquat:PGM ratio in the organo-metallic complex is 1:1 and the formula is of the form $DQ\text{-}PtCl_6^{2-}$.

Example 22

Evaluation of Selectivity in Solid-Liquid Extraction Process

Figure 22:
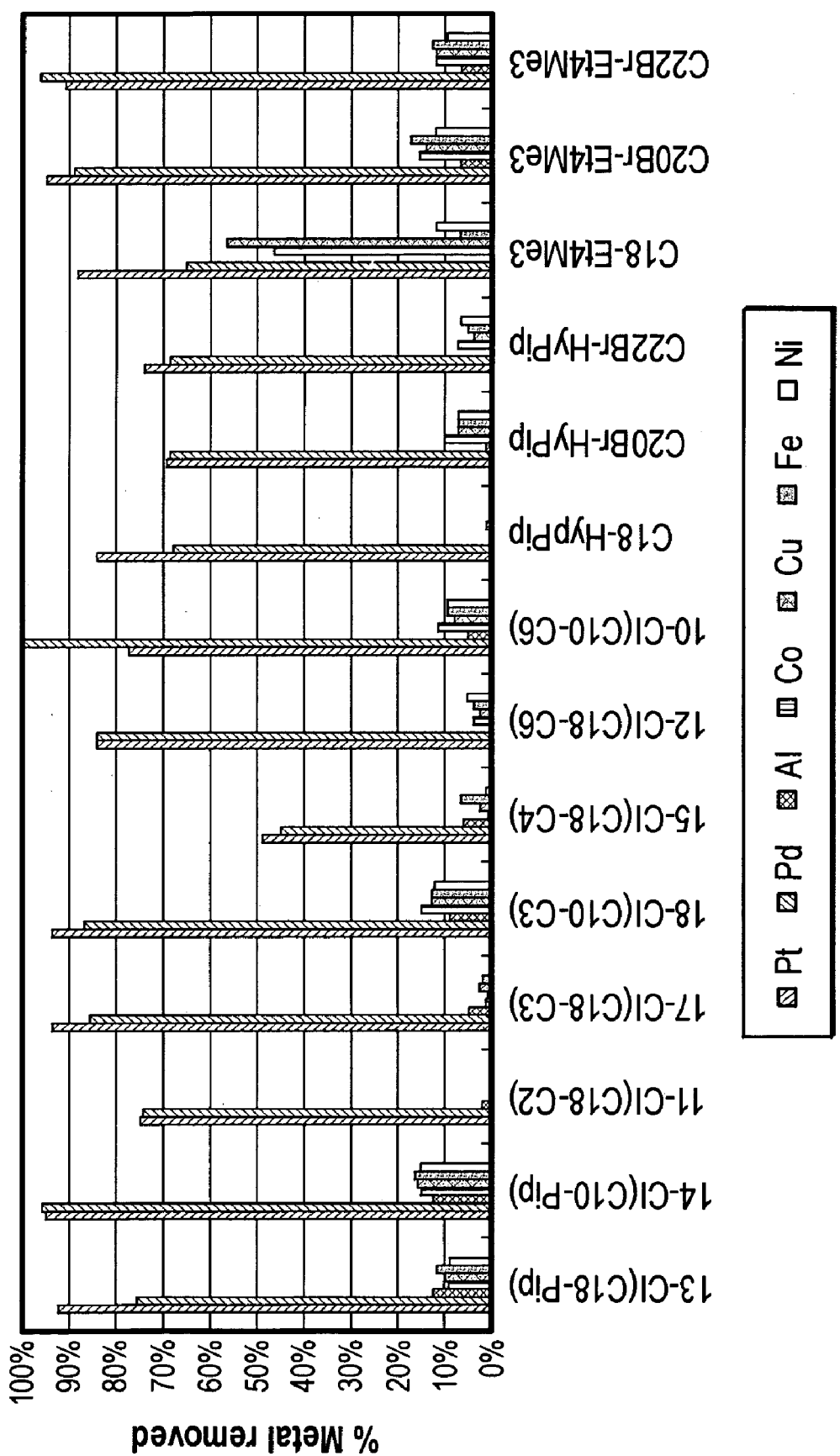
FIG. 22 is a chart of the percent extraction efficiency determined for the diquaternary ammonium salts of FIG. 21 for seven different metals.

In order to determine if selective PGM extraction could be achieved using the solid-liquid extraction process, 14 available diquaternary ammonium salts were scanned with a ~2000 ppm solution of Pt, Pd, Al, Fe, Ni, Co and Cu in 25% Aqua Regia (actual concentrations 1440, 1840, 2160, 1780, 1750, 1070, 1010 ppm, respectively). In this scanning experiment, ~0.20 mmol of each diquat was contacted with 5 mL of ~2000 ppm Soup solution (~0.039 mmol Pt, ~0.091 mmol Pd) for 3 hours with shaking. After shaking, the solutions were filtered by vacuum filtration through a glass filter funnel and the filtered solid was washed with 2 mL of deionized water. The filtered aqueous solutions were analyzed for PGM and base metal concentration on ICP(Pt) and AA(Pd, base metals). The % Extraction Efficiency for each metal was determined for each diquat scanned and is compiled in FIG. 22.

All diquats scanned extracted less than 20% of the available base metals, while extracting a majority of the available PGMs. However diquats 11-C1, 12-C1, 17-C1 and C18-HyPip were found to be extremely selective in the extraction of platinum and palladium, removing less than 5% base metals.

Example 23

Back Extraction Using 12M HCl

Selected diquat solids, after the previous extraction scanning experiment, were dried in a dessicator with a vacuum and then an aliquot of solid was removed to test the feasibility of back extracting the PGMs with 12M HCl. In this experiment, 50 mg of DQ's 13-C1, 14-C1, 11-C1, 17-C1, 15-C1 and C18-HyPip solids that contained PGMs were contacted with 20 mL of 12M HCl for three hours with shaking.

Figure 23:
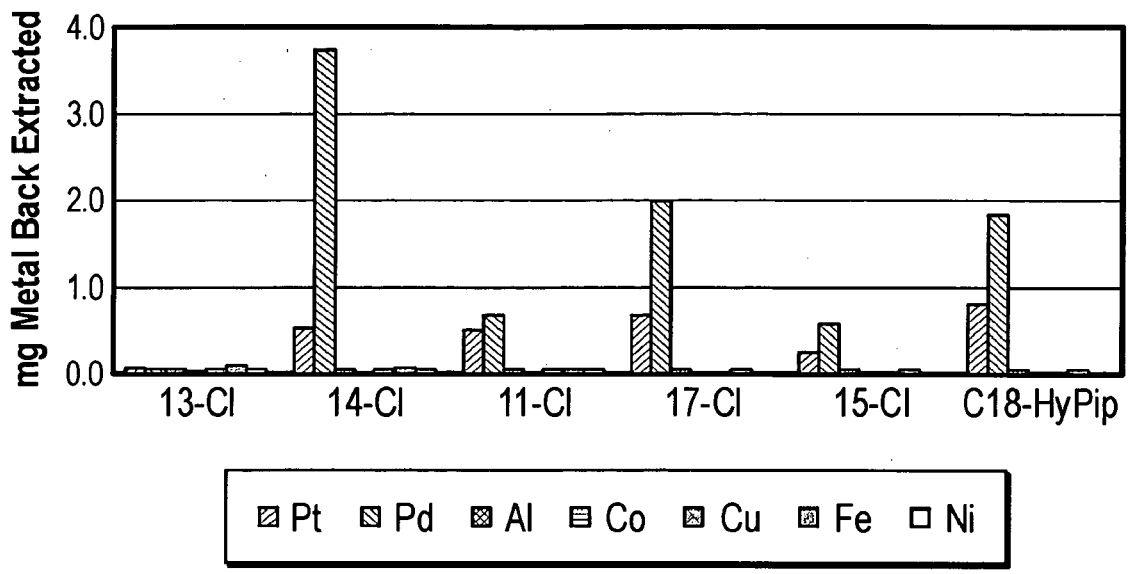
FIG. 23 is a chart of the amount of each metal back extracted for select diquats.

After shaking, the solutions were filtered by vacuum filtration through a glass filter funnel and the filtered solid was washed with 2.5 mL of deionized water. The filtered aqueous solutions were analyzed for PGM and base metal concentration on ICP(Pt) and AA(Pd, base metals). The mg of each metal back extracted was calculated for each DQ and is presented in FIG. 23.

Example 24

Determination of Kinetics of Solid-Liquid Extraction

Figure 24:
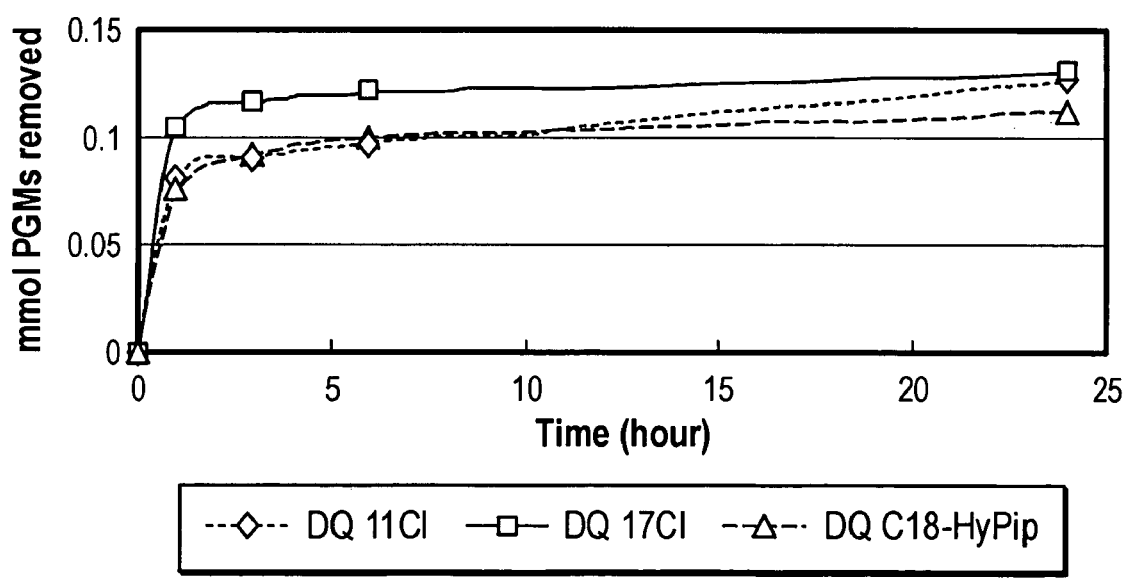
FIG. 24 is a graph of solid-liquid extraction kinetics for three of the diquats.
Figure 25:
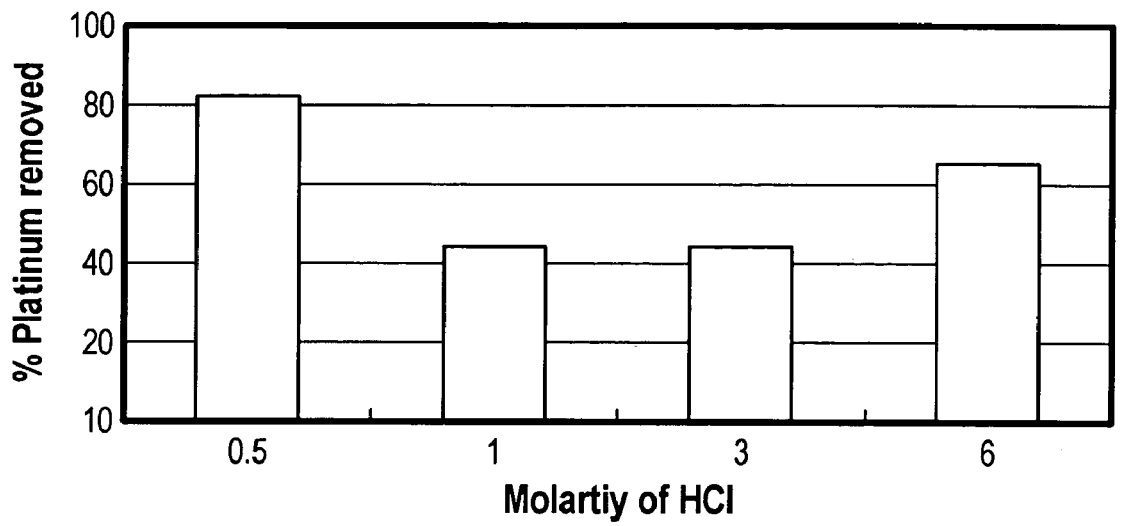
FIG. 25 is a chart showing the effect of molarity of acid on solid-liquid extraction of platinum.

Experiments were performed to determine the kinetics of selected diquats (DQ 11-C1, DQ 17-C1 and DQ C18-HyPip) with a mixture of platinum and palladium ions including base metal ions (Pt, Pd, Fe, Co, Ni, Cu and Al). These experiments involved shaking selected diquat solids with 2000 ppm metal solutions in 25% Aqua Regia for five different lengths of time (30 minutes, 1 hour, 3 hours, 6 hours and 24 hours). The residual metal concentration in the aqueous solution was determined after each period of contact time with the solid materials and kinetics curves created for each diquat tested in FIG. 24. The mmol of palladium and platinum removed was plotted as a "mmol PGMs removed" by summing up the two numbers.

Example 25

Investigation of Dependency of Solid-Liquid Extraction upon Solid Particle Size

Figure 26:
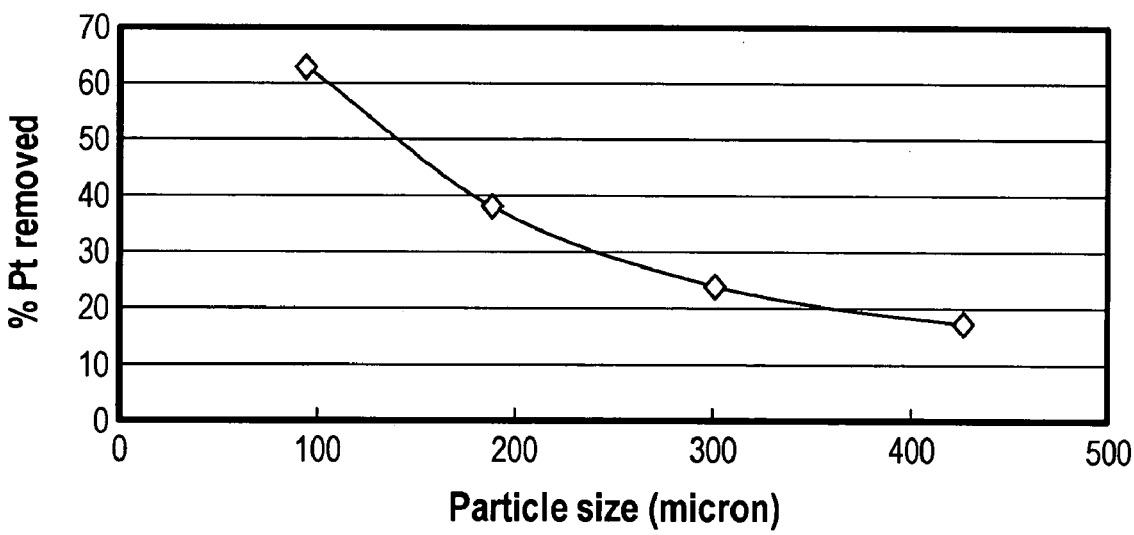
FIG. 26 is a graph showing the effect of diquat powder particle size on platinum absorption.
Figure 27:
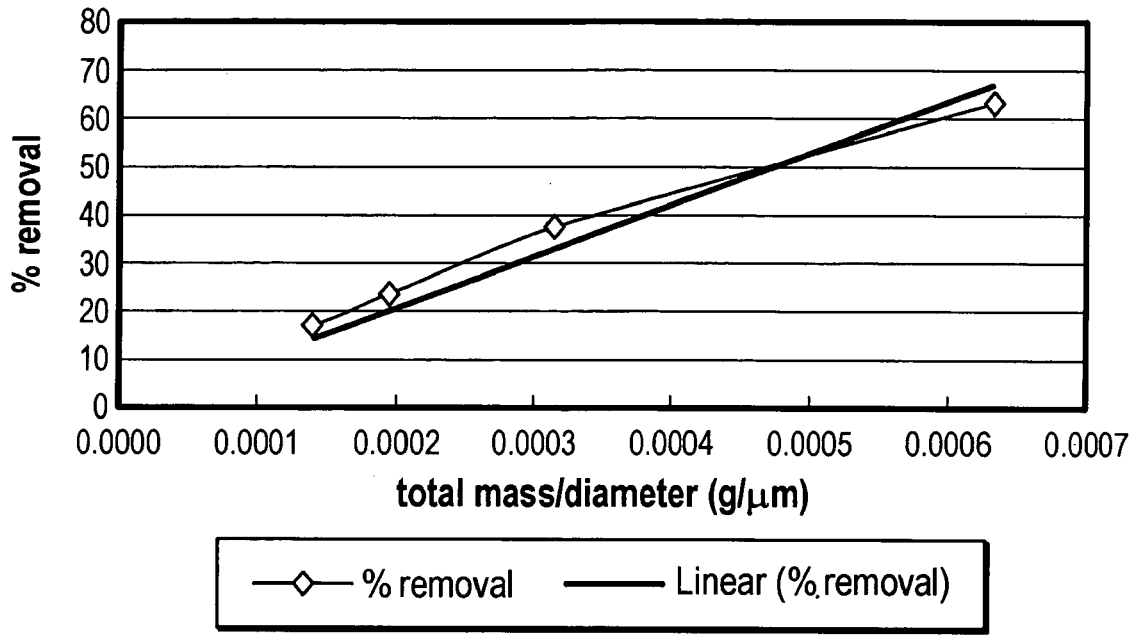
FIG. 27 is a graph showing the effect of diquat surface area on platinum removal in solid-liquid extraction.

An experiment was conducted using different sizes of diquat solids to investigate the effect of surface area on PGM removal. This experiment involved 1-hour shaking four different size particles of DQ 17C1 (63–125 µm, 125–250 µm, 250–354 µm, and 354–500 µm), which were prepared by grinding and sieving DQ 17C1, with 2000 ppm platinum solutions in 3 m HCl. After shaking, samples were filtered by disposable syringe filters and analyzed for residual PGM concentrations on ICP. The total surface area of particles was determined by assuming the diquat particles are spherical and expressed in total mass/particle diameter. The particle size on the x-axis is a median of each range. The % Pt removal efficiency for each particle size is showed in FIG. 26 and the relationship between the total surface area of particles and the % Pt removal is presented in FIG. 27 with the linear regression data.

Example 26

Effect of Mass of Absorbents on Solid-Liquid Extraction

Figure 28:
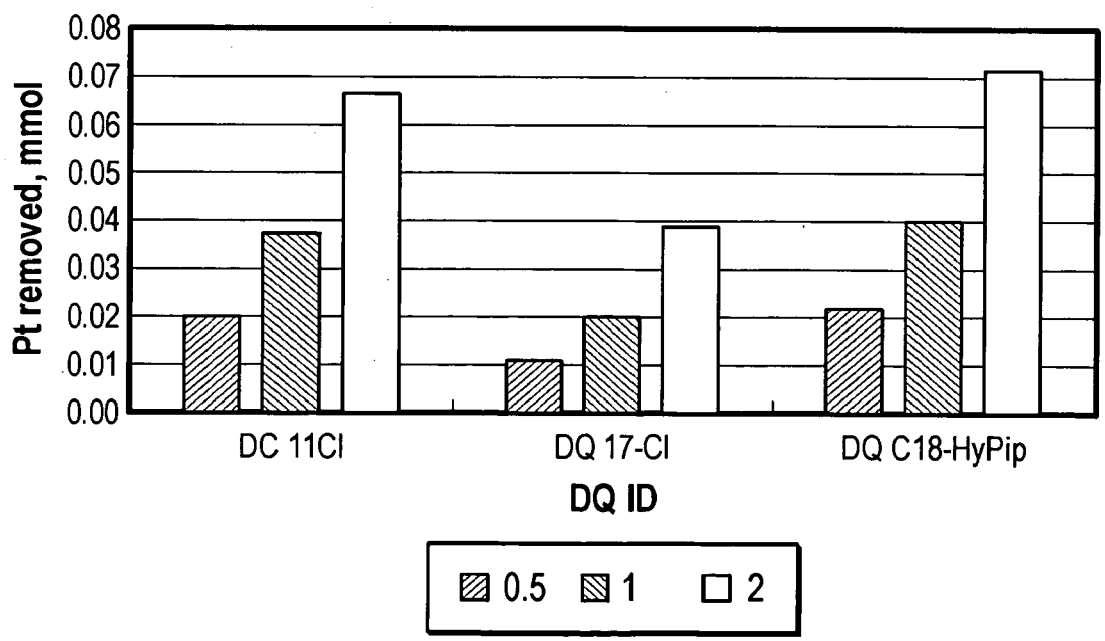
FIG. 28 is a chart showing the effect of the mass of diquats on platinum removal.

This experiment was performed to determine the effect of mass of absorbents (diquats) on PGM removal. Three different weights of selected diquats, which were 0.5, 1 and 2 in mmol-ratio between diquats and platinum, were contacted with 2000 ppm platinum solution in 3M HCl for 3 hours by shaking. The particle size of each diquat was in the range of 250–354 µm. After shaking, samples were filtered by disposable syringe filters and analyzed for residual PGM concentrations on ICP. The mmol platinum removed in a sample was calculated and presented for each diquat in each ratio of diquats and platinum in FIG. 28.

Example 27

Immobilization of Solid Diquats for Solid-Liquid Extraction

Figure 29:
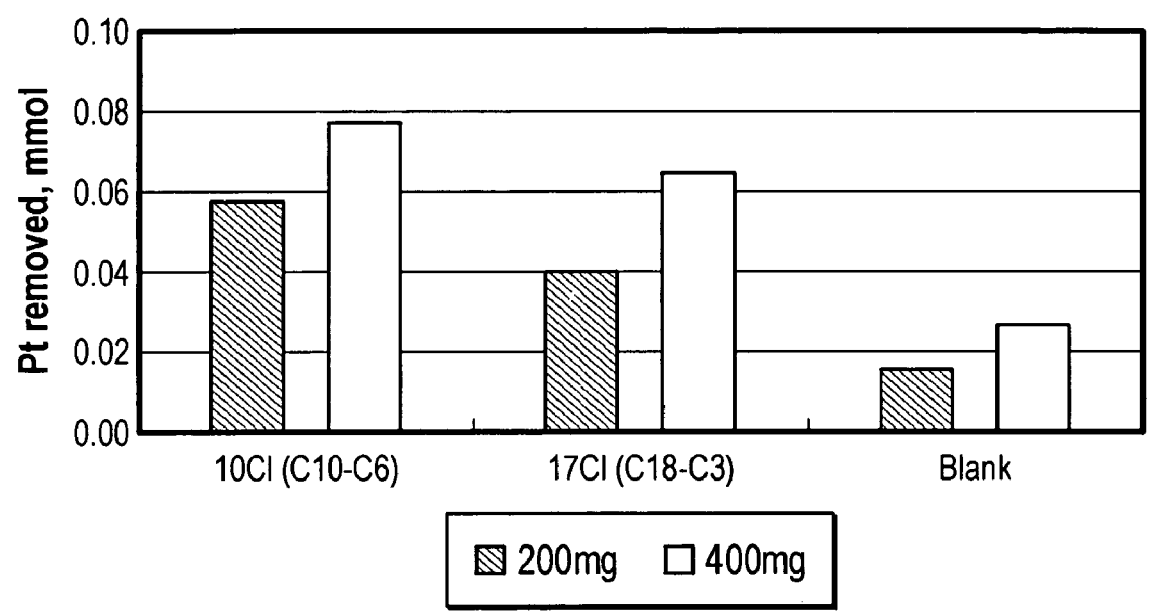
FIG. 29 is a chart showing platinum removal achieved by polystyrene beads coated with diquats.

This experiment was performed to carry out extraction of precious metals by coating solid diquats on polystyrene beads. Two selected diquats (500 mg each) were dissolved in a small amount of chloroform (5 ml) by shaking for 30 min. 2.5 ml of diquat solution was contacted with 1 g of poly(styrene-co-divinyl benzene) beads (size: 300–800 µm) for 2–3 hours. The solution was decanted out, the rest of the wet beads with chloroform were filtered, and the chloroform was evaporated in an oven at 60 overnight. All of the diquats added into the beads were coated on the beads according to the weight differences of the beads. 200 mg or 400 mg of diquat-coated polystyrene beads were contacted with 8 ml of 2000 ppm platinum solution in 3M HCl for 3 hours by shaking. Blank beads were prepared with the other two diquat-coated beads under identical conditions except for the absence of diquats and were used for the experiment too. The platinum removal efficiencies of the beads with different weights are shown in FIG. 29. The blank beads data point might be an experimental error that occurred due to interference of residual chloroform with the ICP-based Pt detection method.

The terms "diquat" and "diquaternary ammonium salt" are used interchangeably herein without an intended distinction.

The terms "comprising," "including," and "having," as used herein, shall be considered as indicating an open group that may include other elements not specified. The terms "a," "an," and the singular forms of words shall be taken to include the plural form of the same words, such that the terms mean that "one or more" or "at least one" of something is provided. The terms "preferably," "preferred," and "may" are used to indicate that the item, condition or step being referred to is an optional (not required) feature or limitation of the invention.

It will be understood from the foregoing description that various modifications and changes may be made in the preferred embodiment of the present invention without departing from its true spirit. It is intended that this description is for purposes of illustration only and should not be construed in a limiting sense. The scope of this invention should be limited only by the language of the following claims.

What is claimed is:

1. A method comprising:
    disposing at least one solid diquaternary ammonium salt including two positively-charged quaternary nitrogens spaced at a distance of less than about 10 Å into contact with an aqueous solution having multiple metal anion complexes including at least one target metal anion complex; and
    separating from the aqueous solution an organo-metallic complex formed between the diquaternary ammonium salt and the at least one target metal anion complex.

2. The method of claim 1, wherein the at least one diquaternary ammonium salt exhibits greater binding specificity for the at least one target metal anion complex than for at least one other metal anion complex in the aqueous solution.

3. The method of claim 1, wherein the at least one diquaternary ammonium salt exhibits selectivity for the at least one target metal anion complex.

4. The method of claim 1, wherein the at least one target metal anion complex is a metal halide.

5. The method of claim 4, wherein the at least one target metal halide complex has an ionic diameter between about 3Å and about 5Å.

6. The method of claim 1, wherein the at least one diquaternary ammonium salt is selected from bis-octadecyl, methyl piperazine ammonium chloride; bis-decyl, methyl-piperazine ammonium chloride; dimethyl, octadecyl ethylene diammonium chloride; dimethyl, decyl ethylene diammonium chloride; dimethyl, octadecyl propyl diammonium chloride; dimethyl, decyl propyl diammonium chloride; dimethyl, octadecyl butyl dianimonium chloride; dimethyl, decyl butyl diammonium chloride; dimethyl, octadecyl hexyl diammonium chloride; dimethyl, decyl hexyl diammonium chloride; bis-hydroxyethyl, octadecyl piperazine ammonium chloride; diethyl, octadecyl propyl diammonium chloride; bis-hydroxyethyl, eicosyl piperazine ammonium bromide; diethyl, eicosyl propyl diammonium bromide; bis-hydroxyethyl, docosyl piperazine ammonium bromide; and diethyl, docosyl piperazine diammonium bromide, or combinations thereof.

7. The method of claim 1, wherein the at least one diquaternary ammonium salt includes a cyclical piperazine derivative.

8. The method of claim 1, wherein the at least one diquaternary ammonium salt extracts the one or more metal anion complex at all acid concentrations.

9. The method of claim 1, wherein the at least one diquaternary ammonium salt is essentially insoluble in the aqueous solution.

10. The method of claim 1, wherein the two quaternary nitrogens are coupled by a saturated alkyl chain.

11. The method of claim 1, wherein the two quaternary nitrogens are coupled by an unsaturated alkyl chain.

12. The method of claim 1, wherein the two quaternary nitrogens are coupled by a straight alkyl chain.

13. The method of claim 1, wherein the two quaternary nitrogens are coupled by a branched alkyl chain.

14. The method of claim 1, wherein the two quaternary nitrogens are coupled in a saturated heterocyclic ring structure.

15. The method of claim 1, wherein the at least one diquaternary ammonium salt is a diquaternary ammonium halide.

16. The method of claim 15, wherein the diquaternary ammonium halide comprises a halide selected from the group consisting of iodide and chloride.

17. The method of claim 1, wherein the two quaternary nitrogens are coupled by an alkyl chain comprising between 2 and 6 methylene groups.

18. The method of claim 17, wherein the diquaternary ammonium halide comprises a halide selected from the group consisting of bromide and fluoride.

19. The method of claim 1, wherein the two quaternary nitrogens are separated by a distance between about 3Å and about 8Å.

20. The method of claim 1, wherein the distance between the two quaternary nitrogens is between about 5 Å less and 5 Å more than the size of the at least one target metal anion complex.

21. The method of claim 1, wherein the quaternary nitrogens are substituted with alkyl chains that are branched, unbranched, saturated, unsaturated, aliphatic, aromatic, cyclic, noncyclic, or heterocyclic.

22. The method of claim 1, wherein the distance between the two quaternary nitrogens allows the formation of a complex between both quaternary nitrogens and the at least one target metal anion complex.

23. The method of claim 1, further comprising:
forming a stable ion pair between the diquaternary ammonium salt and the metal anion complex.

24. The method of claim 1, wherein the at least one target metal anion complex comprises one or more platinum group metal.

25. The method of claim 1, wherein the at least one target metal anion complex comprises one or more anions selected from the group consisting of Pt, Pd, and Rh.

26. The method of claim 25, wherein the multiple metal anion complexes comprise one or more metals selected from the group consisting of Pb, Al, Ba, Ce, Zr, Fe, Cu, Cr, Co, Ni, Mo, Sn, Sb, As, Bi, Zn, Na, K, and Ca.

27. The method of claim 1, wherein the at least one target metal anion complex comprises a metal selected from the group consisting of Ag, Au, Pd, Rh, Pt, Ru, Os, and Ir.

28. The method of claim 1, wherein the at least one target metal anion complex is polyvalent.

29. The method of claim 28, wherein the polyvalent metal anion complex is a platinum group metal halide.

30. The method of claim 29, wherein the platinum group metal halide comprises one or more of the group consisting of [PdCl4]2-, [PdCl6]3-, [PtCl4]2-, and [PtCl6]2-.

31. The method of claim 1, wherein the aqueous solution is acidic.

32. The method of claim 1, wherein the aqueous solution includes an acid comprising one or more of the group consisting of hydrochloric acid, sulfuric acid, and nitric acid.

33. The method of claim 1, wherein the multiple metal anion complexes include Pd, Pt and Rh, and wherein the organo-metallic complex includes at least one platinum group metal selected from the group consisting of Pd, Pt, and Rh.

34. The method of claim 1, further comprising filtering the organo-metallic complex from the aqueous solution.

35. The method of claim 1, further comprising:
separating the at least one target metal anions complex from the organo-metallic complex.

36. The method of claim 35, further comprising:
reusing the diquaternary ammonium salts for subsequent contact with an aqueous solution of one or more target metal anion complex.

37. The method of claim 35, wherein the at least one target metal anions complex is separated from the organo-metallic complex by back-extracting the at least one target metal anion complex from the organo-metallic complex using a second aqueous acid solution.

38. The method of claim 35, wherein the step of separating the at least one target metal anion complexes from the organo-metallic complex includes electrodeposition of the target metal onto an electrode.

39. The method of claim 1, wherein the at least one target metal anion complex comprises one or more metals selected from the group consisting of Pd, Pt, and Rh and wherein the two quaternary nitrogens are separated by an alkyl chain having 2 to 8 carbon atoms.

40. The method of claim 1, wherein the at least one target metal anion complex comprises one or more metals selected from the group consisting of Pd, Pt, and Rh and wherein the two quaternary nitrogens are separated by an alkyl chain having 2 to 6 carbon atoms.

41. The method of claim 1, wherein the at least one target metal anion complex comprises one or more metals selected from the group consisting of Pd, Pt, and Rh and wherein the two quaternary nitrogens are separated by an ailcyl chain having 2 to 3 carbon atoms.

42. The method of claim 1, wherein the at least one metal anion complex comprises one or more metals selected from Pd, Pt, and Rh, and wherein the two quaternary nitrogens are part of a heterocyclic ring structure having 2 to 8 carbon atoms.

43. The method of claim 1, wherein the at least one solid diquaternary ammonium salt is immobilized on a substrate.

44. The method of claim 43, wherein the diquaternary ammonium salts are bound to a solid substrate by one or more of adsorption, absorption, and chemical bonding.

45. The method of claim 44, wherein the solid substrate comprises one of a monomer and a polymer.

46. The method of claim 1, wherein the at least one solid diquaternary ammonium salt is particulate.

47. The method of claim 46, wherein the particulate is a powder.

48. The method of claim 21, wherein the diquaternary ammonium salts are rendered insoluble in aqueous solutions.

49. The method of claim 1, wherein the at least one solid diquaternary ammonium salts is a composite with another solid substrate.

50. The method of claim 44, wherein the solid substrate is organic, inorganic, or bioorganic.

51. The method of claim 1, wherein the at least one solid diquaternary ammonium salt is formed as a membrane, coating, pellet, or bead.

52. The method of claim 1, wherein the at least one solid diquaternary ammonium salt is mixed with another solid substrate.

53. The method of claim 24, wherein the two quaternary nitrogens are coupled in an unsaturated heterocyclic ring structure.

54. The method of claim 24, wherein the two quaternary nitrogens are coupled in a straight heterocyclic ring structure.

55. The method of claim 24, wherein the two quaternary nitrogens are coupled in a branched heterocyclic ring structure.

56. A method for recovering Pd and Pt from a mixture of metals comprising:

dissolving the metals into an acidic solution to form metal anion complexes; contacting the acidic solution with an iodide to form a Pd complex; separating the Pd complex from the acidic solution using organic solvent extraction; contacting the acidic solution with a solid diquaternary ammonium salt, wherein the distance between two quaternary nitrogens is less than about 10 Å; selectively binding the Pt anion complex to the diquaternary ammonium salt; and separating the aqueous solution from the diquaternary ammonium salts having the bound Pt anion complex.

57. The method of claim 56, wherein the acidic solution contains acids selected from hydrochloric acid, sulfuric acid, nitric acid and combinations thereof.

58. A method for separating metals from a mixture of metals comprising:

a. dissolving the mixture of metals into an acidic solution to form metal anion complexes;

b. contacting the acidic solution with a first diquaternary ammonium salt that is a selective extractant for a first metal anion complex to form a first organometallic complex;

c. separating the first organometallic complex from the aqueous solution;

d. contacting the acidic solution with a second diquaternary ammonium salt that is a selective extractant for a second metal anion complex to form a second organometallic complex; and e. separating the organometallic complex from the aqueous solution.

59. The method of claim 58, further comprising:

f. contacting the acidic solution with an iodide, wherein the mixture of metals dissolved into the acidic solution comprises Pd, to form a Pd complex; and g. separating the Pd complex from the acidic solution using organic solvent extraction.

* * * * *